US009028010B2

(12) United States Patent
Miyashita

(10) Patent No.: US 9,028,010 B2
(45) Date of Patent: May 12, 2015

(54) BRAKING CONTROL SYSTEM

(75) Inventor: Michihiro Miyashita, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 365 days.

(21) Appl. No.: 13/698,593

(22) PCT Filed: May 19, 2010

(86) PCT No.: PCT/JP2010/058453
§ 371 (c)(1),
(2), (4) Date: Nov. 16, 2012

(87) PCT Pub. No.: WO2011/145191
PCT Pub. Date: Nov. 24, 2011

(65) Prior Publication Data
US 2013/0057055 A1    Mar. 7, 2013

(51) Int. Cl.
*B60T 13/46* (2006.01)
*B60T 17/02* (2006.01)
*B60T 13/52* (2006.01)
*B60T 13/57* (2006.01)

(52) U.S. Cl.
CPC .................. *B60T 17/02* (2013.01); *B60T 13/52* (2013.01); *B60T 13/57* (2013.01)

(58) Field of Classification Search
USPC .............. 303/10–12, 122.09, 122.12–122.14, 303/115.1–115.4
See application file for complete search history.

(56) References Cited

FOREIGN PATENT DOCUMENTS

| DE | 19929880 A1 | 1/2001 |
|---|---|---|
| DE | 10057728 A1 | 6/2001 |
| JP | 57-4450 A | 1/1982 |
| JP | 58-149846 A | 9/1983 |
| JP | 01-301452 A | 12/1989 |
| JP | 07-266932 A | 10/1995 |
| JP | 08-239031 A | 9/1996 |
| JP | 10-236301 A | 9/1998 |
| JP | 2000-310133 A | 11/2000 |
| JP | 2005-330844 A | 12/2005 |

*Primary Examiner* — Vishal Sahni
(74) *Attorney, Agent, or Firm* — Kenyon & Kenyon LLP

(57) ABSTRACT

Provided is a braking control system including: an internal combustion engine serving as a power source of a vehicle; a brake servo unit operated by a negative pressure supplied thereto; a passage configured to supply an intake negative pressure of the internal combustion engine to the brake servo unit; and a negative pressure pump configured to generate a negative pressure by being driven by power transmitted from a wheel of the vehicle and transmit the generated negative pressure to the brake servo unit, wherein the negative pressure pump is driven so as to supply the negative pressure to the brake servo unit during execution of inertia running in which the internal combustion engine stops and the vehicle runs by inertia.

9 Claims, 18 Drawing Sheets

BRAKING CONTROL SYSTEM

This is a 371 national phase application of PCT/JP2010/058453 filed 19 May 2010, the entire content of which is incorporated herein by reference.

FIELD OF THE INVENTION

The present invention relates to a braking control system.

BACKGROUND OF THE INVENTION

Hitherto, there is known a vehicle equipped with a device such as a brake servo unit that uses a negative pressure.

Patent Literature 1 discloses a technique of controlling a vacuum pump for a diesel hybrid vehicle which detects a negative pressure inside a negative pressure tank in an EV running mode, starts an engine when the negative pressure is not sufficient, and drives a vacuum pump by an idling operation.

CITATION LIST

Patent Literature

Patent Literature 1: Japanese Patent Application Laid-open Publication No. 2005-330844

SUMMARY OF THE INVENTION

Technical Problem

When a power source such as an internal combustion engine is started in order to suppress the lack in the negative pressure, fuel efficiency may be degraded. For example, in a vehicle which is equipped with a brake servo unit receiving an intake negative pressure of an internal combustion engine and is able to execute an inertia running in which the internal combustion engine stops and the vehicle runs by inertia, when the internal combustion engine is started during the execution of the inertia running in order to suppress the lack in the negative pressure, the fuel efficiency is degraded. Therefore, it is desirable to suppress the lack in the negative pressure supplied to the brake servo unit without starting the internal combustion engine.

It is an object of the present invention to provide a braking control system capable of suppressing the lack in the negative pressure without starting the internal combustion engine during the execution of the inertia running in the vehicle which is equipped with the brake servo unit receiving the intake negative pressure of the internal combustion engine and is able to execute the inertia running in which the internal combustion engine stops and the vehicle runs by the inertia.

Solution to Problem

A braking control system according to the present invention includes an internal combustion engine serving as a power source of a vehicle; a brake servo unit operated by a negative pressure supplied thereto; a passage configured to supply an intake negative pressure of the internal combustion engine to the brake servo unit; and a negative pressure pump configured to generate a negative pressure by being driven by power transmitted from a wheel of the vehicle and transmit the generated negative pressure to the brake servo unit; and an accumulator capable of accumulating the intake negative pressure during operation of the internal combustion engine and supplying the accumulated negative pressure to the brake servo unit, wherein during execution of inertia running in which the internal combustion engine stops and the vehicle runs by inertia, it is possible to drive the negative pressure pump and supply negative pressure to the brake servo unit without supplying negative pressure by the accumulator and it is possible to supply the negative pressure accumulated in the accumulator to the brake servo unit without supplying the negative pressure by the negative pressure pump.

(Deleted)

In the braking control system, it is preferable that the negative pressure is supplied to the brake servo unit when the negative pressure of the passage decreases during the execution of the inertia running.

In the braking control system, it is preferable that in supply of the negative pressure with respect to the brake servo unit, a priority in the supply of the negative pressure using the accumulator is higher than a priority in the supply of the negative pressure using the negative pressure pump.

In the braking control system, it is preferable that the negative pressure pump supplies the generated negative pressure to the accumulator in addition to the brake servo unit, and when the negative pressure accumulated in the accumulator decreases, the negative pressure pump is preferably driven so as to supply the negative pressure to the accumulator.

In the braking control system, it is preferable that in supply of the negative pressure with respect to the brake servo unit, a priority in the supply of the negative pressure using the negative pressure pump is higher than a priority in the supply of the negative pressure using the accumulator.

In the braking control system, it is preferable to further include a notifying device configured to notify to a driver of the vehicle at least one of a state where the negative pressure supplied to the brake servo unit decreases and a state where the negative pressure is supplied to the brake servo unit, when the negative pressure of the passage decreases and the negative pressure is supplied to the brake servo unit during the execution of the inertia running.

In the braking control system, it is preferable to further include a control valve configured to close or open an opening portion of the accumulator, wherein the opening portion is preferably opened by the control valve upon accumulating the intake negative pressure in the accumulator and upon supplying the negative pressure accumulated in the accumulator to the brake servo unit, and at a time different from the cases of the accumulation and the supply of the negative pressure, the opening portion is preferably closed by the control valve.

In the braking control system, it is preferable that the accumulator is connected to the passage, the control valve is preferably capable of switching to a predetermined state in which the opening portion is opened so as to communicate between the passage and the accumulator and the passage near the internal combustion engine side in relation to the accumulator and the brake servo unit is closed, and the control valve is preferably switched to the predetermined state during the supply of the negative pressure.

In the braking control system, it is preferable that when there is no negative pressure supply to the brake servo unit by the negative pressure pump during the execution of the inertia running, the internal combustion engine is re-started in a state that the accumulator has available capacity to supply negative pressure to the brake servo unit.

Advantageous Effects of Invention

The braking control system according to the present invention includes the negative pressure pump which is driven by the power transmitted from the wheel of the vehicle, generates the negative pressure, and supplies the generated negative pressure to the brake servo unit, and an accumulator capable of accumulating the intake negative pressure during operation of the internal combustion engine and supplying the accumulated negative pressure to the brake servo unit, wherein during execution of inertia running in which the internal combustion engine stops and the vehicle runs by inertia, it is possible to drive the negative pressure pump and supply negative pressure to the brake servo unit without supplying negative pressure by the accumulator and it is also possible to supply the negative pressure accumulated in the accumulator to the brake servo unit without supplying the negative pressure by the negative pressure pump. Then, the braking control system drives the negative pressure pump and supplies the negative pressure to the brake servo unit during execution of inertia running in which the internal combustion engine stops and the vehicle runs by the inertia. Thus, according to the braking control system of the present invention, there is an effect that the lack in the negative pressure can be suppressed without starting the internal combustion engine during the execution of the inertia running.

DETAILED DESCRIPTION

Figure 1:
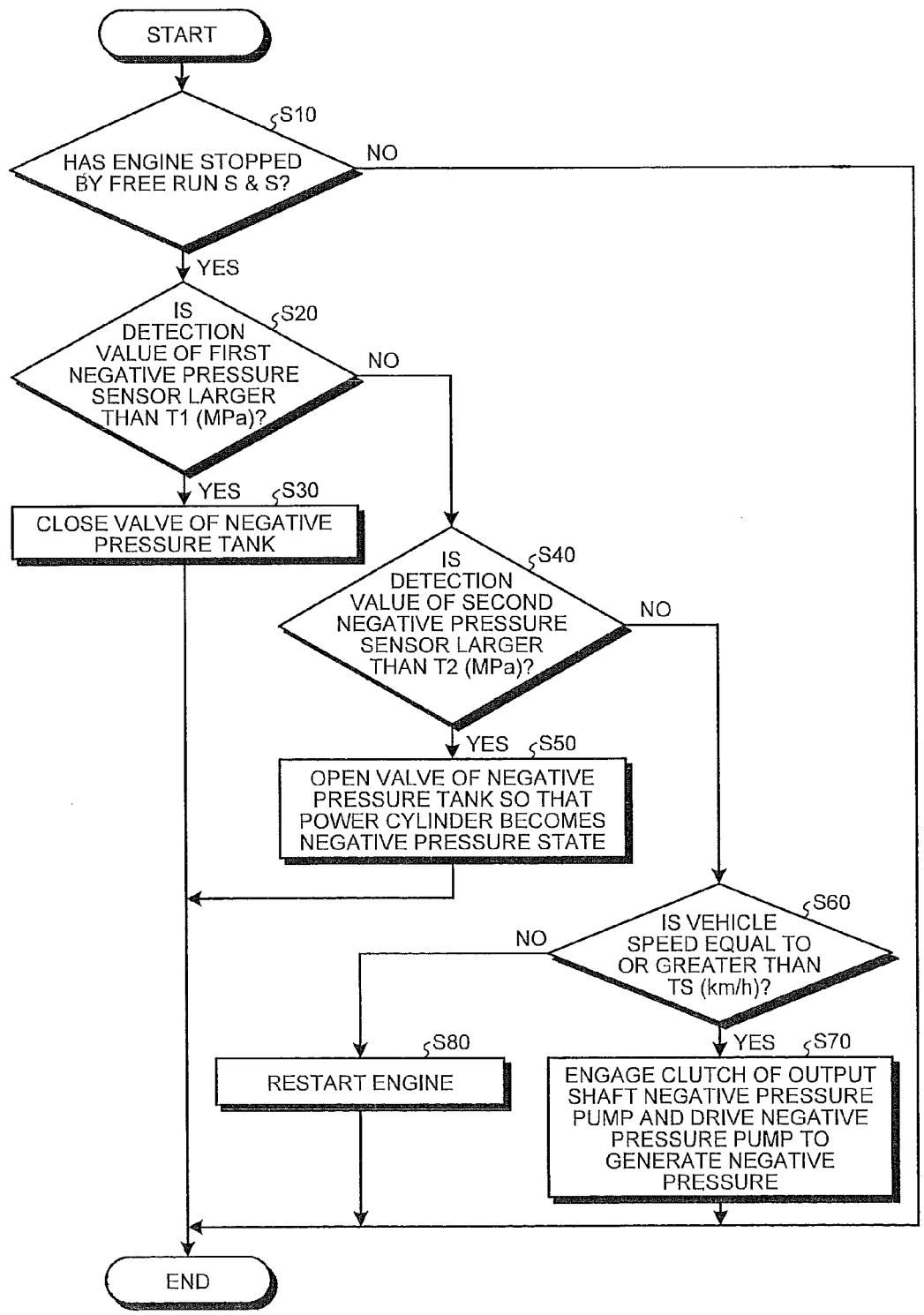
FIG. 1 is a flowchart illustrating an operation of a braking control system according to a first embodiment.

Hereinafter, a braking control system according to embodiments of the present invention will be described in detail by referring to the drawings. Furthermore, the present invention is not limited to the embodiment. Further, the constituents of the embodiment below include a constituent which can be easily considered by a person skilled in the art or a substantially identical constituent.

First Embodiment

Figure 2:
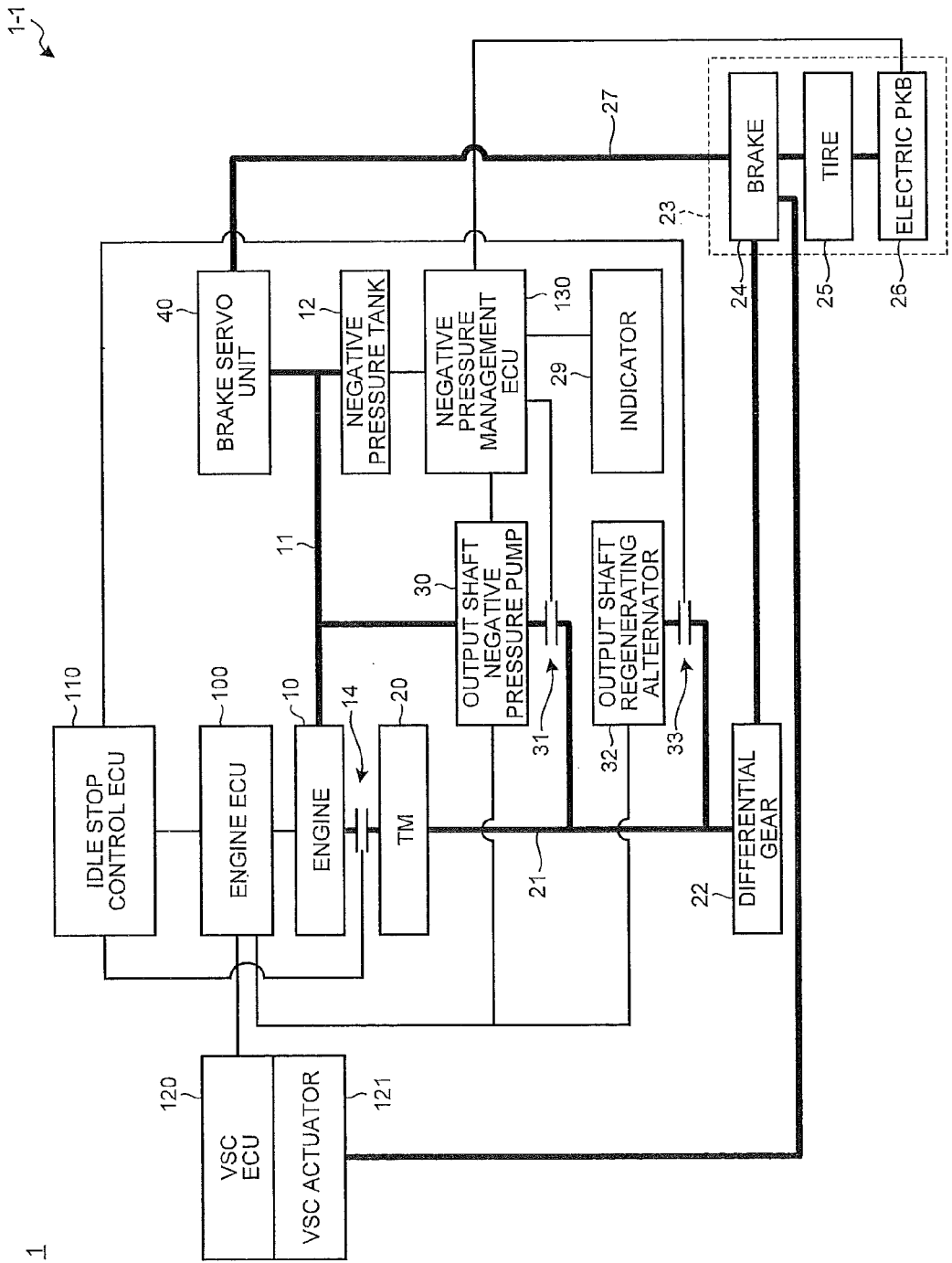
FIG. 2 is a diagram illustrating a schematic configuration of a vehicle according to the first embodiment.

Referring to FIGS. 1 to 8, a first embodiment will be described. The embodiment relates to a braking control system. FIG. 1 is a flowchart illustrating an operation of a braking control system according to the embodiment of the present invention, and FIG. 2 is a diagram illustrating a schematic configuration of a vehicle according to the embodiment.

A braking control system 1-1 of the embodiment executes the inertia running (free run) which stops an engine (see the reference sign 10 in FIG. 2) and causes a vehicle to run by inertia (inertia force) and executes the free run stopping and starting which automatically returns from the inertia running. When a driving force is not needed, a TM is set to be neutral and the free run is executed. The free run stop and start often stops the engine in a running mode. In order to suppress the lack in a negative pressure which is supplied to a brake servo unit (see the reference sign 40 in FIG. 2) during the execution of the free run and to guarantee the brake negative pressure, the braking control system 1-1 includes an output shaft negative pressure pump (see a negative pressure pump and the reference sign 30 in FIG. 2). The output shaft negative pressure pump 30 is driven by the power which is transmitted from an output shaft (see the reference sign 21 in FIG. 2) of the TM, thereby generating the negative pressure.

By operating the output shaft negative pressure pump 30, it is possible to suppress the lack in the negative pressure supplied to the brake servo unit 40. On the other hand, since the operation of the output shaft negative pressure pump 30 leads to an increase in friction, there is a possibility that the fuel efficiency improvement effect of the free run may be degraded when the operation time of the output shaft negative pressure pump 30 extends. The braking control system 1-1 includes a negative pressure tank (see the reference sign 12 in FIG. 2) in addition to the output shaft negative pressure pump 30. The intake negative pressure is accumulated in the negative pressure tank 12 during the operation of an engine 10, and the negative pressure tank 12 is maintained to be a low pressure, whereby it is possible to supply the negative pressure of the negative pressure tank 12 to the brake servo unit 40 during the free run. As a result, the operation time of the output shaft negative pressure pump 30 can be shortened, and hence the fuel efficiency improvement effect by the free run can be improved.

In FIG. 2, reference numeral 1 represents a vehicle. The vehicle 1 includes the engine 10, a TM 20, a differential gear 22, a wheel 23, the output shaft negative pressure pump 30, an output shaft regenerating alternator 32, the brake servo unit 40, and the like. The engine 10 is a power source of the vehicle 1. As the engine 10, for example, an existing internal combustion engine can be used. The TM 20 is a transmission. The TM 20 which is provided in the vehicle 1 of the embodiment an automatic transmission. The engine 10 and the TM 20 are connected to each other through a clutch 14. When the clutch 14 is in an engaged state, power is transmitted by the engine 10 and the TM 20 with each other. Further, when the clutch 14 is in an open state, power is not transmitted by the engine 10 and the TM 20.

The output shaft 21 of the TM 20 is connected to respective wheels (driving wheels) 23 through the differential gear 22. The differential gear 22 is a differential mechanism, and transmits the rotation of the output shaft 21 to each wheel 23. The wheel 23 includes a brake 24, a tire 25, and an electric parking brake (hereinafter, referred to as an "electric PKB") 26. The brake 24 is a braking device which is operated by the hydraulic pressure supplied thereto and exerts a braking force in the vehicle 1. The brake servo unit 40 is connected to the brake 24 through an oil passage 27. The brake servo unit 40 is operated by the negative pressure supplied thereto, and is an assisting device which assists a driver's braking operation by using the negative pressure. The brake servo unit 40 is connected to an inlet manifold (not illustrated) of the engine 10 through a negative pressure pipe 11. The inlet manifold is an intake pipe of the engine 10, and the inlet manifold becomes a negative pressure state during the operation of the engine 10. The negative pressure (the intake negative pressure) of the engine 10 which is generated in the inlet manifold is supplied to the brake servo unit 40 through the negative pressure pipe (a passage) 11.

Figure 3:
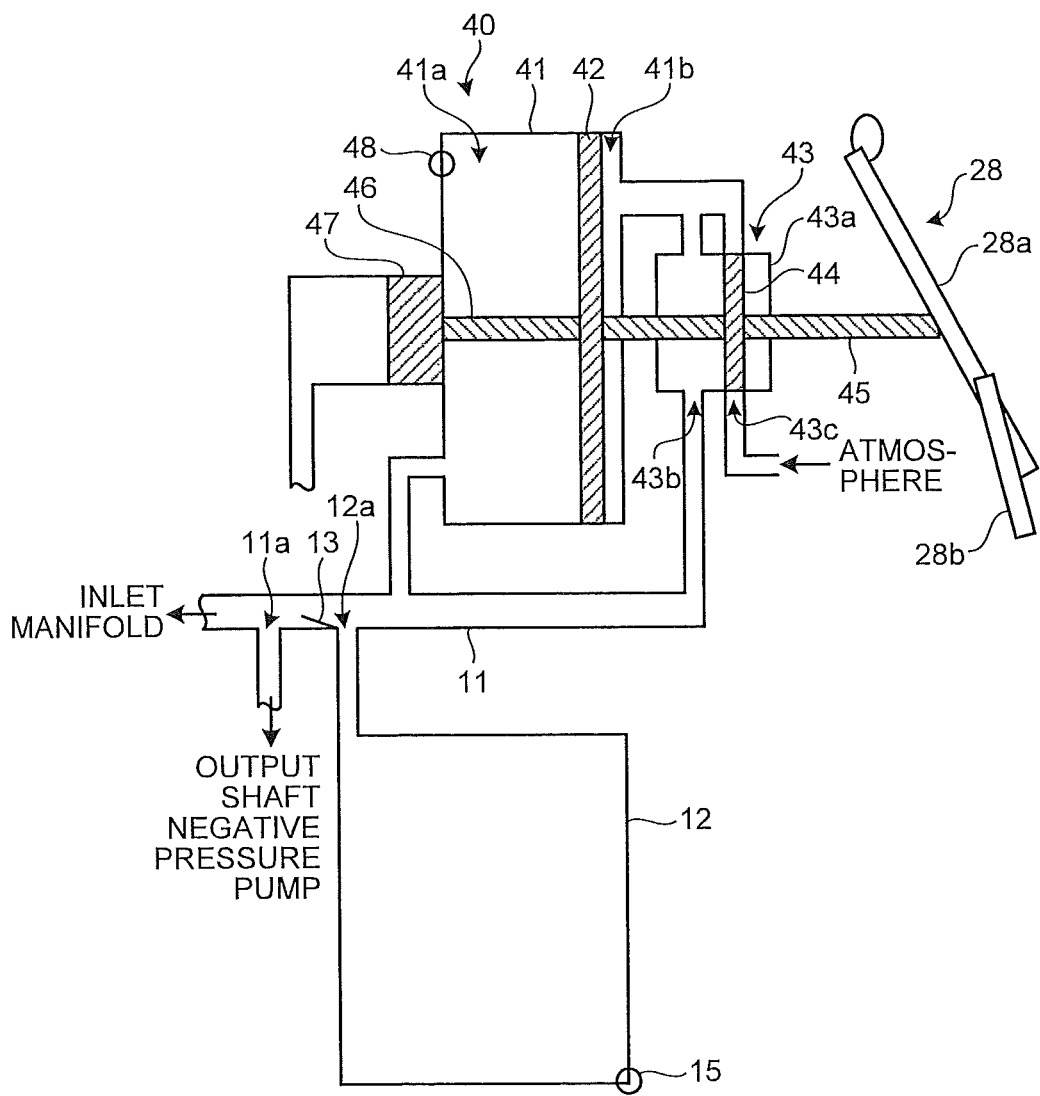
FIG. 3 is a diagram illustrating a schematic configuration of a brake servo unit.

FIG. 3 is a diagram illustrating a schematic configuration of the brake servo unit 40. The brake servo unit 40 includes a power cylinder 41, a power piston 42, a valve 43, an operating rod 45, a push rod 46, and the like.

The power piston 42 is provided inside the power cylinder 41. The inside of the power cylinder 41 is divided by the power piston 42 into a negative pressure chamber 41a and an air chamber 41b. The air chamber 41b communicates with the negative pressure pipe 11 and the atmosphere through the valve 43. The valve 43 includes a valve body 43a, a vacuum valve 43b, an air valve 43c, and a valve plunger 44. The vacuum valve 43b includes an opening portion which is connected to the air chamber 41b and an opening portion which is connected to the negative pressure pipe 11 as opening portions which are formed in the valve body 43a. Further, the air valve 43c includes an opening portion which is connected to the air chamber 41b and an opening portion which communicate with the atmosphere as opening portions which are formed in the valve body 43a.

The valve plunger 44 is a valve element which selectively blocks the vacuum valve 43b or the air valve 43c. The valve plunger 44 is connected to a brake pedal 28 through the operating rod 45. The brake pedal 28 includes a rod 28a which is rotatably supported and a pedal portion 28b. When the driver steps on the pedal portion 28b, the rod 28a rotates, and the operating rod 45 is driven in the axial direction. When the valve plunger 44 moves in the axial direction along with the driven operating rod 45, the vacuum valve 43b and the air valve 43c are opened or closed.

When the driver does not step on the brake pedal 28, the valve plunger 44 blocks the air valve 43c. In this case, when the air valve 43c is blocked and the vacuum valve 43b is opened as illustrated in FIG. 3, the negative pressure is supplied from the negative pressure pipe 11 to the air chamber 41b through the vacuum valve 43b. Further, the negative pressure chamber 41a normally communicates with the negative pressure pipe 11, and the negative pressure is supplied through the negative pressure pipe 11. That is, when the driver does not step on the brake pedal 28, the negative pressure chamber 41a and the air chamber 41b have the same pressure. The negative pressure chamber 41a is equipped with a first negative pressure sensor 48 which detects the negative pressure of the negative pressure chamber 41a.

Figure 4:
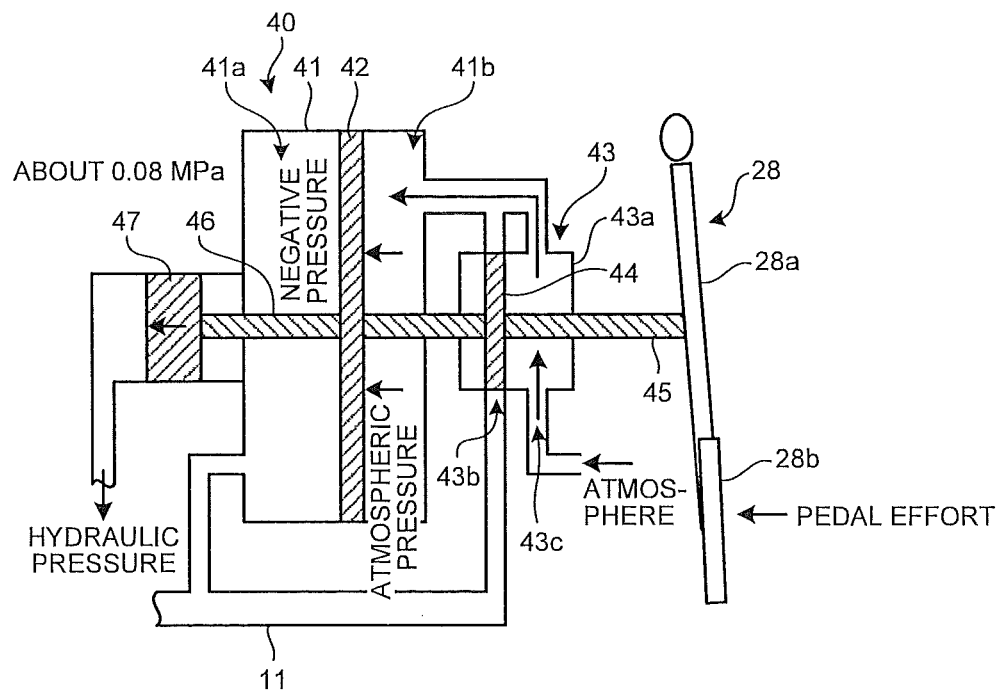
FIG. 4 is a diagram illustrating the brake servo unit when stepping on a brake pedal.

FIG. 4 is a diagram illustrating the brake servo unit 40 when the brake pedal 28 is being stepped. When the brake pedal 28 is being stepped, the valve plunger 44 moves in the axial direction so as to block the vacuum valve 43b and to open the air valve 43c. Then, the atmosphere flows into the air chamber 41b through the air valve 43c, and the inside of the air chamber 41b becomes an atmospheric pressure state. Accordingly, an assisting force acts on the power piston 42 due to a differential pressure between the negative pressure chamber 41a to which the negative pressure is supplied and the air chamber 41b being in the atmospheric pressure state. The assisting force is exerted in the same direction as that of the direction of the pedal effort applied from the driver, and reduces the driver's pedal effort necessary for the braking operation. The driver's pedal effort and the assisting force are transmitted to a hydraulic piston 47 of a master cylinder through the push rod 46 to generate the brake hydraulic pressure. The brake hydraulic pressure is supplied to the brake 24 through the oil passage 27.

The absolute pressure of the inlet manifold during the operation of the engine 10 is, for example, about 0.02 MPa. Further, the atmospheric pressure is about 0.098 MPa. The assisting force which acts on the power piston 42 is defined by the magnitude of the negative pressure as the differential pressure between the absolute pressure of the inlet manifold and the atmospheric pressure. The assisting force becomes larger as the absolute pressure of the inlet manifold becomes lower with respect to the atmospheric pressure (the negative pressure becomes larger).

Returning to FIG. 2, the output shaft regenerating alternator 32 is connected to the output shaft 21 of the TM 20 through an alternator clutch 33. The output shaft regenerating alternator 32 is a generator which generates electric power by the mechanical power. When the alternator clutch 33 is in an engaged state, the output shaft 21 is connected to the rotary shaft of the output shaft regenerating alternator 32, and the output shaft regenerating alternator 32 generates electric power while being driven by the power transmitted from the output shaft 21. The electric power which is output from the output shaft regenerating alternator 32 is consumed by the auxiliary constituents of the engine 10 or is charged to a battery (not illustrated). On the other hand, when the alternator clutch 33 is in an open state, the rotary shaft of the output shaft regenerating alternator 32 is separated from the output shaft 21, and the rotation of the output shaft regenerating alternator 32 stops.

The vehicle 1 is equipped with an engine ECU 100 which controls the engine 10 and an idle stop control ECU 110 which controls the idle stop. The engine ECU 100 executes the control of the engine 10 including the injection control of the fuel injection amount or the injection timing of the engine 10, the ignition control, and the like. Further, the engine ECU 100 is connected to the output shaft negative pressure pump 30 and the output shaft regenerating alternator 32, and can control each of the output shaft negative pressure pump 30 and the output shaft regenerating alternator 32.

The idle stop control ECU 110 controls the free run stop and start. The vehicle 1 stops the engine 10 by separating the engine 10 from the TM 20 in a running mode, and can execute the free run which causes the vehicle 1 to run by the inertia running. The free run is executed, for example, when an accelerator is turned off, that is, a driving force is not needed. The idle stop control ECU 110 is connected to the engine ECU 100, and can transmit and receive a signal to and from the engine ECU 100. Further, the idle stop control ECU 110 is connected to the clutch 14 and the alternator clutch 33, and controls each of the clutch 14 and the alternator clutch 33.

The idle stop control ECU 110 opens the clutch 14 so that the TM 20 becomes neutral when a condition for executing the predetermined free run is satisfied in a case where the driving force is not needed, thereby requesting the engine ECU 100 to stop the engine. The engine ECU 100 which receives the request for stopping the engine stops the operation of the engine 10. Accordingly, the vehicle 1 becomes the free run state in which the vehicle runs by the inertia. In the free run state, the idle stop control ECU 110 causes the output shaft regenerating alternator 32 to generate electric power while the alternator clutch 33 is in an engaged state. While the engine stops due to the free run, electric power cannot be generated by an alternator (not illustrated) of the engine 10. For this reason, electric power is generated by the output shaft regenerating alternator 32 instead of the alternator of the engine 10. The engine ECU 100 controls the power generation amount or the like of the output shaft regenerating alternator 32 in the free run state. The engine ECU 100 controls the power generation amount of the output shaft regenerating alternator 32 based on the consumed power of the auxiliary constituents of the engine 10, the charged state of the battery, or the like.

Further, the idle stop control ECU 110 ends the free run when the condition for executing the free run is not satisfied during the execution of the free run. The idle stop control ECU 110 requests the engine ECU 100 to start the engine, and the clutch 14 is engaged when the operation of the engine 10 starts. Further, when the free run ends, the idle stop control ECU 110 opens the alternator clutch 33. In this way, the idle stop control ECU 110 executes the free run stop and start which automatically starts the free run (stops the engine) in a running mode and ends the free run (starts the engine). By the free run stop and start control, the fuel consumption is suppressed by stopping the engine 10 in a running mode, and the fuel efficiency can be improved.

A VSCECU 120 is configured to control a VSC (Vehicle Stability Control) device which reduces the lateral sliding of the wheel 23 by the brake control. The VSCECU 120 reduces the lateral sliding by controlling the braking force of the brake 24 of each wheel 23 through the control of a VSC actuator 121. Further, the VSCECU 120 is connected to the engine ECU 100, and can transmit and receive a signal to and from the engine ECU 100. The VSCECU 120 may reduce the lateral sliding by controlling the output of the engine 10 through the engine ECU 100.

Here, the negative pressure which is supplied to the brake servo unit 40 decreases (the absolute pressure of the negative pressure chamber 41a increases) after the brake operation is performed during the execution of the free run (for example, after the brake operation is performed plural times). Since the engine 10 is stopped during the execution of the free run, the negative pressure is not recovered as in the operation of the engine 10 even when the negative pressure of the inlet manifold decreases. If the engine 10 is started when the negative pressure of the inlet manifold decreases, the negative pressure can be recovered. However, from the viewpoint of the improvement in the fuel efficiency, it is desirable to supply the negative pressure to the brake servo unit 40 without starting the engine 10.

The braking control system 1-1 of the embodiment includes the negative pressure tank 12 and the output shaft negative pressure pump 30, and hence can suppress the lack in the negative pressure which is supplied to the brake servo unit 40 without starting the engine 10 during the execution of the free run.

The output shaft negative pressure pump 30 is connected to the output shaft 21 of the TM 20 through a pump clutch 31. The output shaft negative pressure pump 30 is a vacuum pump which is driven by the mechanical power and generates a negative pressure. When the pump clutch 31 is in an engaged state, the output shaft 21 and the output shaft negative pressure pump 30 are connected to each other, so that the output shaft negative pressure pump 30 is driven by the power transmitted from the output shaft 21 to generate a negative pressure. The output shaft negative pressure pump 30 is connected to the negative pressure pipe 11, and suctions a gas of the negative pressure pipe 11 during the operation thereof so as to decrease the pressure of the negative pressure pipe 11 (increase the negative pressure). That is, when the pump clutch 31 is in an engaged state during the execution of the free run, the output shaft negative pressure pump 30 is driven by the power which is transmitted from the wheel 23 thereto through the output shaft 21 to generate a negative pressure, and the generated negative pressure is supplied to the brake servo unit 40. On the other hand, when the pump clutch 31 is in an open state, the output shaft negative pressure pump 30 is separated from the output shaft 21, and the output shaft negative pressure pump 30 stops. Furthermore, if the pump clutch 31 is in an engaged state when the vehicle 1 runs by the power output from the engine 10, the output shaft negative pressure pump 30 is driven by the power transmitted from the engine 10 to generate a negative pressure.

Further, the negative pressure tank 12 is connected to the negative pressure pipe 11. The negative pressure tank 12 is an accumulator which accumulates the intake negative pressure and supplies the accumulated intake negative pressure to the brake servo unit 40. As illustrated in FIG. 3, the negative pressure tank 12 is connected to the brake servo unit 40 in relation to a connection portion 11a with respect to the output shaft negative pressure pump 30 in the negative pressure pipe 11. Further, the connection portion between the negative pressure pipe 11 and the negative pressure tank 12 is equipped with a valve (a control valve) 13. The valve 13 blocks or opens an opening portion 12a of the negative pressure tank 12. The valve 13 includes an actuator (not illustrated), and can switch to three states illustrated below by the actuator.

[First State]

A first state indicates a state where the opening portion 12a is blocked and the circulation of the gas between the inside of the negative pressure tank 12 and the negative pressure pipe 11 is interrupted.

[Second State (Predetermined State)]

A second state indicates a state where the negative pressure pipe 11 communicates with the negative pressure tank 12 by opening the opening portion 12a and the circulation of the gas between the inside of the negative pressure tank 12 and the inlet manifold or the output shaft negative pressure pump 30 is interrupted by blocking the negative pressure pipe 11 near the engine 10 in relation to the negative pressure tank 12 and the brake servo unit 40.

[Third State]

A third state indicates a state where the opening portion 12a of the negative pressure tank 12 and the negative pressure pipe 11 are both opened (not blocked).

In the third state, the inlet manifold, the output shaft negative pressure pump 30, the negative pressure tank 12, and the brake servo unit 40 communicate with one another through the negative pressure pipe 11. The negative pressure tank 12 is equipped with a second negative pressure sensor 15 which detects the negative pressure inside the negative pressure tank 12.

Returning to FIG. 2, the vehicle 1 is equipped with a negative pressure management ECU 130 which manages the negative pressure supplied to the brake servo unit 40. The negative pressure management ECU 130 is connected to the negative pressure tank 12, the output shaft negative pressure pump 30, the pump clutch 31, and the electric PKB 26, and controls the negative pressure tank 12, the output shaft negative pressure pump 30, the pump clutch 31, and the electric PKB 26. A signal representing the detection result of the first negative pressure sensor 48 and the second negative pressure sensor 15 is input to the negative pressure management ECU 130. Further, the negative pressure management ECU 130 is connected to the valve 13 of the negative pressure tank 12, and can switch the state of the valve 13. The negative pressure management ECU 130 is connected to the engine ECU 100, the idle stop control ECU 110, and the VSCECU 120, and can transmit and receive a signal to and from each of ECUs 100, 110, and 120. The braking control system 1-1 of the embodiment includes the engine 10, the negative pressure pipe 11, the negative pressure tank 12, the brake servo unit 40, the output shaft negative pressure pump 30, the engine ECU 100, the idle stop control ECU 110, the VSCECU 120, and the negative pressure management ECU 130.

The vehicle 1 is equipped with an indicator 29. The indicator 29 is a notifying device which notifies any one of the state where the negative pressure supplied to the brake servo unit 40 decreases and the state where the negative pressure is supplied to the brake servo unit 40 to the driver. The indicator 29 is installed at a position, for example, an instrument panel where the driver can see the indicator. The indicator 29 of the embodiment is lit when the negative pressure of the negative pressure chamber 41a decreases during the execution of the inertia running and the negative pressure is supplied to the brake servo unit 40, and notifies the driver of both the state where the negative pressure supplied to the brake servo unit 40 decreases and the negative pressure is supplied to the brake servo unit 40 by the output shaft negative pressure pump 30 or the negative pressure tank 12. Furthermore, the notifying device is not limited to the indicator, and for example, a navigation device or a head-up display (HUD) may serve as the notifying device. That is, the notifying device may be configured to cause the driver to recognize the state where the negative pressure supplied to the brake servo unit 40 decreases or the state where the negative pressure is supplied to the brake servo unit 40 in a way of vision or sound.

Figure 5:
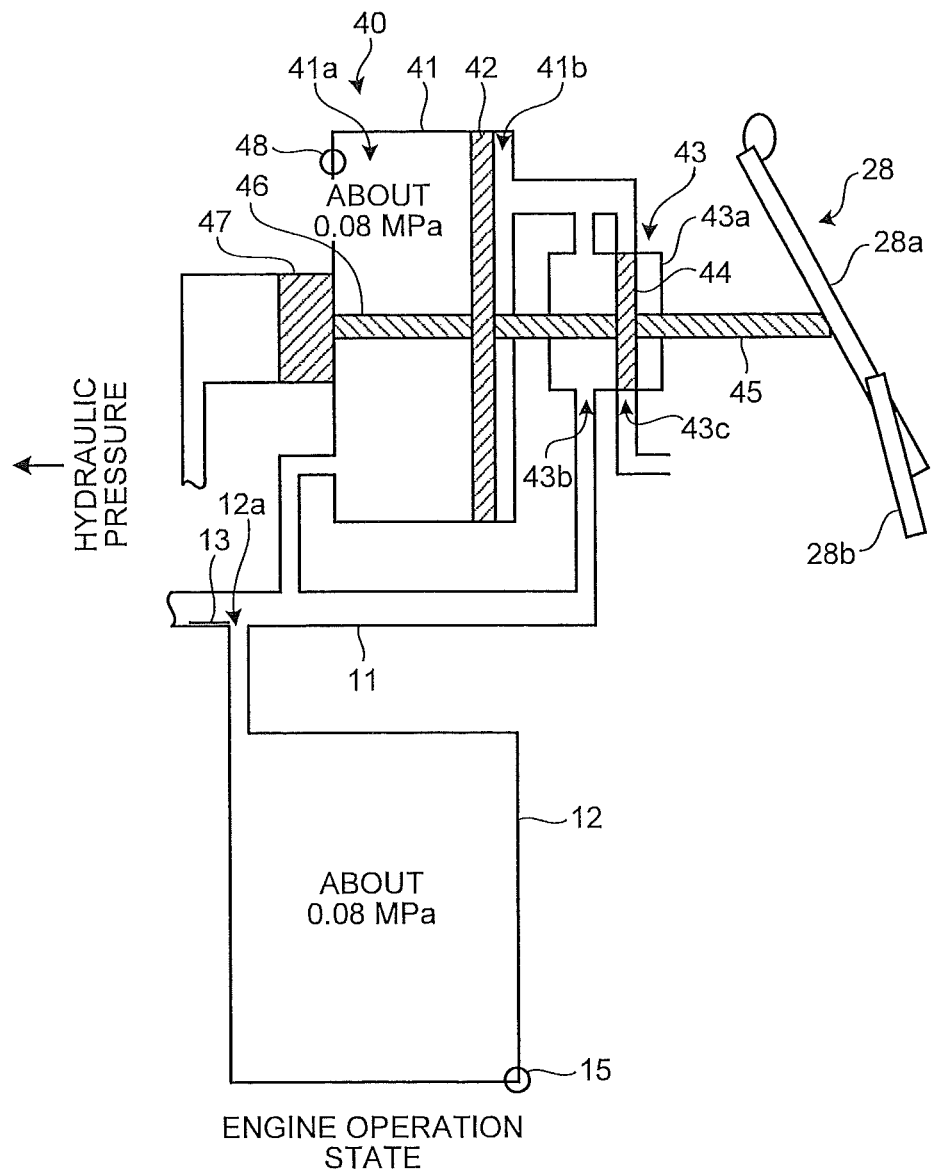
FIG. 5 is a diagram illustrating the brake servo unit and a valve when an engine is operated.
Figure 7:
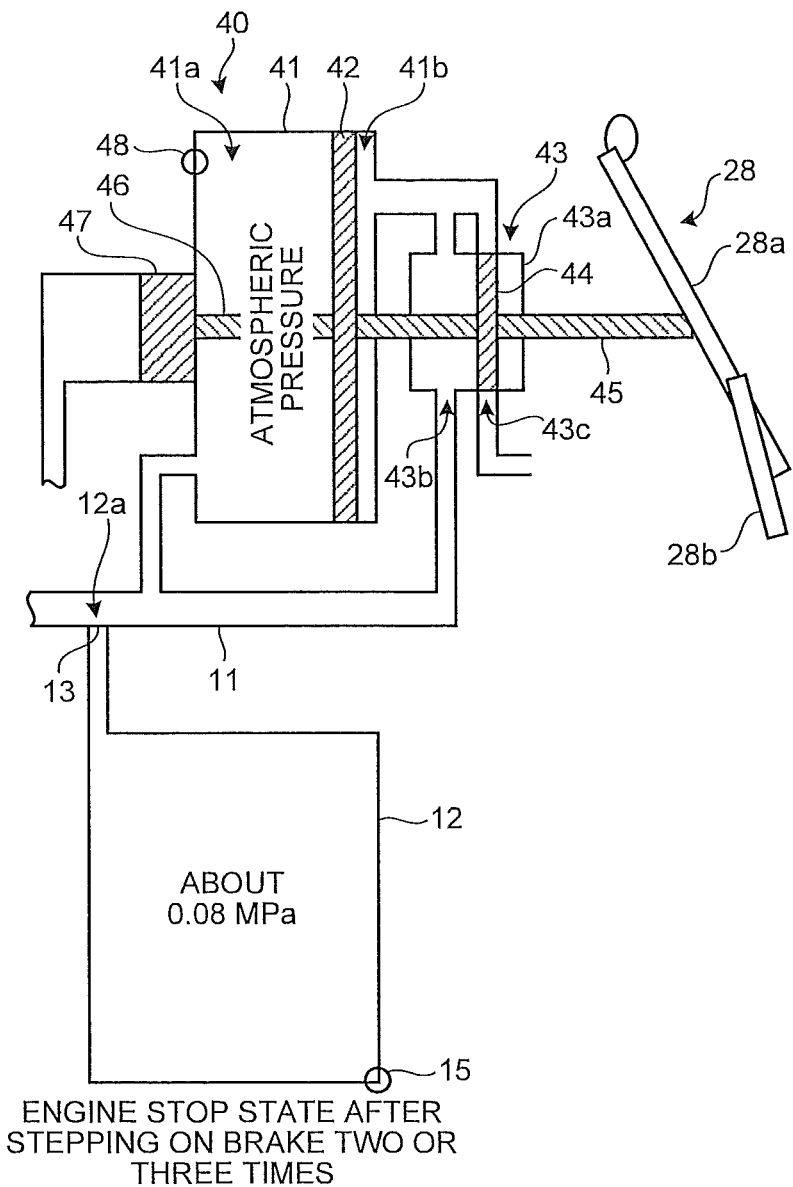
FIG. 7 is a diagram illustrating the brake servo unit and the valve after operating the brake while the engine is stopped.
Figure 8:
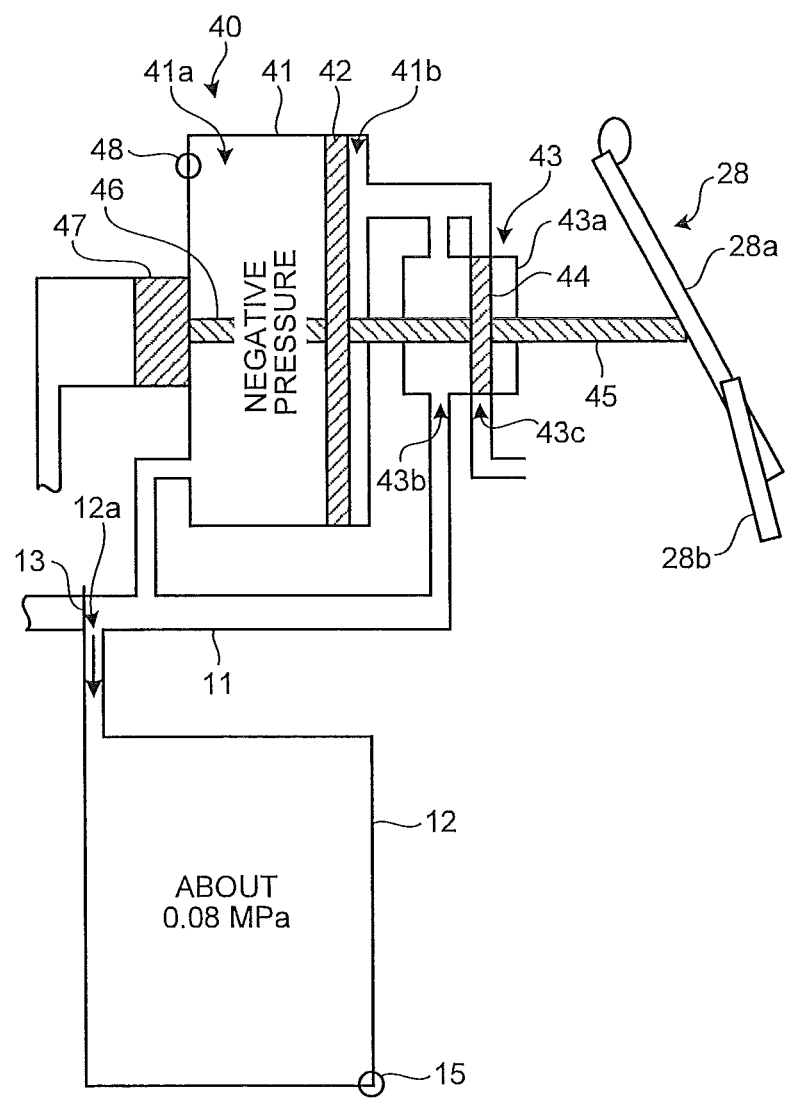
FIG. 8 is a diagram illustrating a state where a negative pressure is supplied from a negative pressure tank.

Hereinafter, referring to FIGS. 5 to 8, the control of switching the valve 13 using the negative pressure management ECU 130 will be described. FIG. 5 is a diagram illustrating the brake servo unit 40 and the valve 13 during the operation of the engine, FIG. 6 is a diagram illustrating the brake servo unit 40 and the valve 13 before operating the brake after the engine stops, FIG. 7 is a diagram illustrating the brake servo unit 40 and the valve 13 after the brake is operated while the engine stops, and FIG. 8 is a diagram illustrating a state where the negative pressure is supplied from the negative pressure tank 12.

As illustrated in FIG. 5, the negative pressure management ECU 130 causes the valve 13 to be in the third state during the operation of the engine 10. Accordingly, the negative pressure of the inlet manifold is introduced into each of the negative pressure chamber 41a and the negative pressure tank 12, and the inside of the negative pressure chamber 41a and the inside of the negative pressure tank 12 respectively become a negative pressure state (for example, a negative pressure of about 0.08 MPa). In this way, the negative pressure tank 12 accumulates the intake negative pressure of the engine 10 during the operation of the engine 10. During the accumulation, the opening portion 12a of the negative pressure tank 12 is opened by the valve 13.

Figure 6:
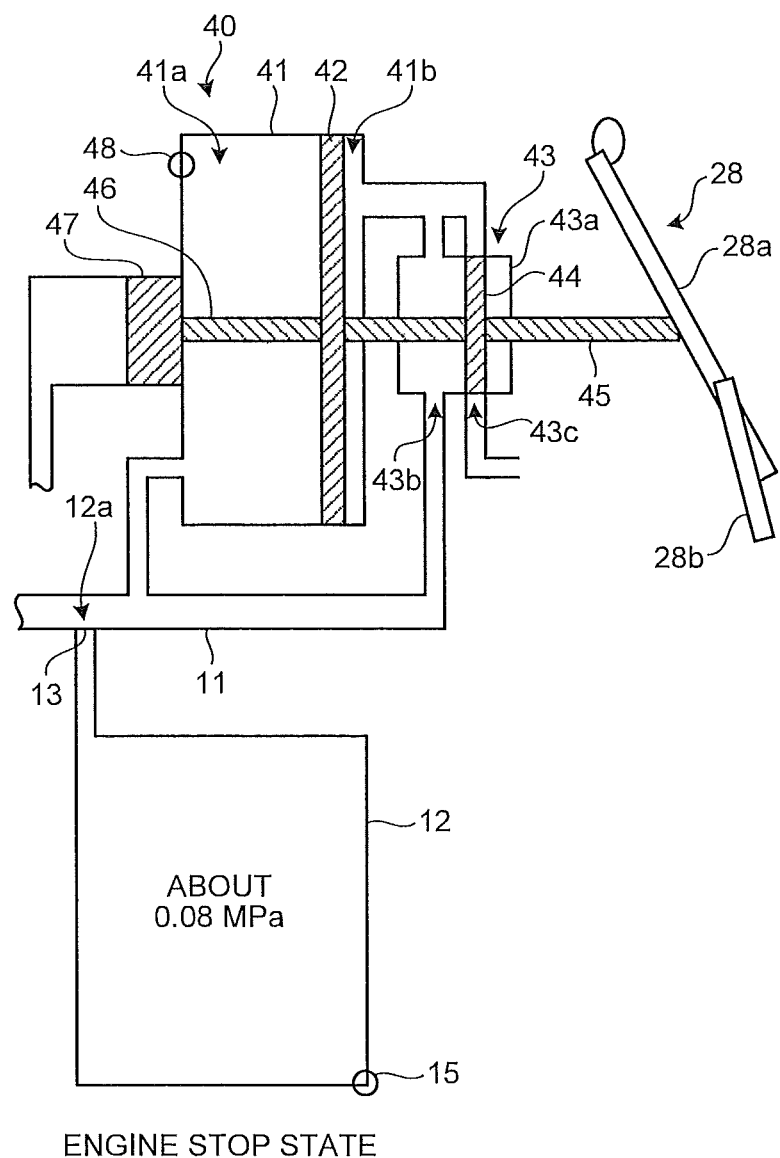
FIG. 6 is a diagram illustrating the brake servo unit and the valve before operating a brake after the engine is stopped.

As illustrated in FIG. 6, the negative pressure management ECU 130 causes the valve 13 to be in the first state when starting the free run by stopping the engine 10. In the first state, the valve 13 blocks the opening portion 12a of the negative pressure tank 12, and interrupts the circulation of the gas between the inside of the negative pressure tank 12 and the negative pressure pipe 11. Accordingly, even when the negative pressure of the negative pressure pipe 11 changes due to the operation of the brake during the execution of the free run, the inside of the negative pressure tank 12 can be maintained in the negative pressure state by the negative pressure introduced thereinto during the operation of the engine.

When the brake operation is performed during the execution of the free run, the negative pressure inside the negative pressure chamber 41a and the negative pressure pipe 11 decreases. After stepping on the brake pedal 28 two or three times while the engine stops, the absolute pressure inside the negative pressure chamber 41a increases to, for example, the atmospheric pressure or so as illustrated in FIG. 7. In this case, it is desirable to supply the negative pressure to the negative pressure chamber 41a without starting the engine 10. The negative pressure management ECU 130 causes the valve 13 to be in the second state as illustrated in FIG. 8 when the negative pressure of the negative pressure chamber 41a decreases. In the second state, the valve 13 blocks the negative pressure pipe 11, and interrupts the circulation of the gas between the side of the negative pressure tank 12 and the brake servo unit 40 and the side of the inlet manifold and the output shaft negative pressure pump 30. Accordingly, the negative pressure of the negative pressure tank 12 is supplied to the negative pressure chamber 41a and the air chamber 41b (which is selected when the brake operation is not performed) through the negative pressure pipe 11. That is, the negative pressure management ECU 130 supplies the negative pressure which is accumulated in the negative pressure tank 12 to the brake servo unit 40 during the execution of the inertia running. During the supply of the negative pressure, the valve 13 becomes the second state, and the opening portion 12a of the negative pressure tank 12 is opened. Further, at the time different from the accumulation and the supply of the negative pressure, the opening portion 12a is blocked by the valve 13 as illustrated in FIG. 6.

Referring to FIG. 1, an operation of the braking control system 1-1 of the embodiment will be described. The control flow illustrated in FIG. 1 is repeated, for example, at a predetermined interval while the vehicle 1 runs. First, in step S10, the negative pressure management ECU 130 determines whether the engine stops (the free run is executed) by the free run S & S (stop and start). As a result of the determination, when it is determined that the engine stops by the free run S & S (YES in step S10), the routine proceeds to step S20. In another case (NO in step S10), the control flow ends.

In step S20, the negative pressure management ECU 130 determines whether the detection value of the first negative pressure sensor 48 is larger than a predetermined first negative pressure T1 (MPa). The negative pressure management ECU 130 determines whether the negative pressure of the negative pressure chamber 41a of the brake servo unit 40 is the negative pressure larger than the specific negative pressure (the first negative pressure T1). Here, since the negative pressure chamber 41a communicates with the negative pressure pipe 11, the detection value of the first negative pressure sensor 48 corresponds to the negative pressure of the negative pressure pipe 11. In the embodiment, when the detection value of the first negative pressure sensor 48 is not larger than the first negative pressure T1, that is, the negative pressure of the negative pressure pipe 11 decreases during the execution of the free run, the negative pressure is supplied to the brake servo unit 40 by the negative pressure tank 12 or the output shaft negative pressure pump 30. Accordingly, it is possible to suppress the negative pressure which is supplied to the brake servo unit 40 from becoming smaller than the first negative pressure T1.

The first negative pressure T1 is set based on, for example, the feeling when stepping on the brake pedal 28 (the assisting force which is generated by the brake servo unit 40). It is desirable to set the first negative pressure T1 to, for example, a value in the range in which the brake stepping-on feeling does not change due to the operation of the engine 10. The first negative pressure T1 may be set to, for example, 0.04 MPa. Since the negative pressure tank 12 and the output shaft negative pressure pump 30 are managed so that the negative pressure of the negative pressure chamber 41a does not become smaller than the first negative pressure T1, a change in the brake stepping-on feeling is suppressed, and hence the drivability improves. When it is determined that the detection value of the first negative pressure sensor 48 is larger than the first negative pressure T1 as a result of the determination in step S20 (YES in step S20), the routine proceeds to step S30. In another case (NO in step S20), the routine proceeds to step S40.

In step S30, the negative pressure management ECU 130 closes the valve of the negative pressure tank 12. The negative pressure management ECU 130 controls the actuator of the valve 13 so that the valve 13 of the negative pressure tank 12 is closed (the first state). When step S30 is executed, the control flow ends.

In step S40, the negative pressure management ECU 130 determines whether the detection value of the second negative pressure sensor 15 is larger than a predetermined second negative pressure T2 (MPa). The negative pressure management ECU 130 determines whether the negative pressure inside the negative pressure tank 12 is a negative pressure larger than the specific negative pressure (the second negative pressure T2). The second negative pressure T2 may be a value equal to that of the first negative pressure T1, and may be a negative pressure larger than the first negative pressure T1. The second negative pressure T2 may be, for example, 0.04 MPa. When it is determined that the detection value of the second negative pressure sensor 15 is larger than the second negative pressure T2 as a result of the determination in step S40 (YES in step S40), the routine proceeds to step S50. In another case (NO in step S40), the routine proceeds to step S60.

In step S50, the negative pressure management ECU 130 opens the valve of the negative pressure tank 12 so that the power cylinder 41 becomes a negative pressure state. The negative pressure management ECU 130 causes the valve 13 to be in the second state (see FIG. 8) or the third state (see FIG. 5). Accordingly, the negative pressure of the negative pressure tank 12 is supplied to the power cylinder 41, so that the negative pressure of the negative pressure chamber 41a increases. In the second state, the negative pressure tank 12 can supply the negative pressure from the negative pressure tank 12 to the brake servo unit 40 while the inlet manifold and the output shaft negative pressure pump 30 are interrupted. Further, the negative pressure management ECU 130 lights the indicator 29, and notifies the driver of the state where the negative pressure supplied to the negative pressure chamber 41a decreases and the negative pressure is currently supplied to the negative pressure chamber 41a. When step S50 is executed, the control flow ends.

In step S60, the negative pressure management ECU 130 determines whether a vehicle speed is equal to or greater than a predetermined vehicle speed TS (km/h). In step S60, it is determined whether the negative pressure may be appropriately generated by the output shaft negative pressure pump 30. Since the output shaft negative pressure pump 30 is driven by the mechanical power transmitted from the output shaft 21, the negative pressure generating performance changes in response to the number of rotations of the output shaft 21. The predetermined vehicle speed TS is set to, for example, the vehicle speed of the lower limit in the range of the vehicle speed at which the output shaft negative pressure pump 30 may supply an appropriate negative pressure to the power cylinder 41. The predetermined vehicle speed TS may be, for example, 10 km/h. When it is determined that the vehicle speed is equal to or greater than the predetermined vehicle speed TS as a result of the determination in step S60 (YES in step S60), the routine proceeds to step S70. In another case (NO in step S60), the routine proceeds to step S80.

In step S70, the clutch of the output shaft negative pressure pump 30 is engaged by the negative pressure management ECU 130, and the output shaft negative pressure pump 30 is driven to generate a negative pressure. The negative pressure management ECU 130 drives the output shaft negative pressure pump 30 while the pump clutch 31 is engaged. The negative pressure which is generated by the output shaft negative pressure pump 30 is supplied to the power cylinder 41 through the negative pressure pipe 11. Furthermore, when generating the negative pressure by the output shaft negative pressure pump 30, the valve 13 of the negative pressure tank 12 becomes the first state or the third state. For example, since the negative pressure tank 12 is blocked when the valve 13 becomes the first state (see FIG. 6), it is possible to immediately recover the negative pressure which is supplied to the power cylinder 41. When the valve 13 becomes the third state (see FIG. 5), the negative pressure which is generated by the output shaft negative pressure pump 30 is guided to the negative pressure tank 12, and hence the negative pressure can be accumulated in the negative pressure tank 12. In this way, when the valve 13 becomes the third state, the output shaft negative pressure pump 30 supplies the generated negative pressure to the negative pressure tank 12 in addition to the brake servo unit 40. Further, the negative pressure management ECU 130 lights the indicator 29, and notifies the driver of the state where the negative pressure supplied to the negative pressure chamber 41a decreases and the negative pressure is currently supplied to the negative pressure chamber 41a. When step S70 is executed, the control flow ends.

In step S80, the engine 10 is restarted by the negative pressure management ECU 130. The negative pressure management ECU 130 starts the engine 10 through the engine ECU 100 by engaging the clutch 14. The negative pressure of the inlet manifold is recovered by the operation of the engine 10, and the negative pressure is supplied to the power cylinder 41. When step S80 is executed, the control flow ends.

As described above, according to the braking control system 1-1 of the embodiment, it is possible to suppress the lack in the negative pressure which is supplied to the brake servo unit 40 without starting the engine 10 by supplying the negative pressure from the negative pressure tank 12 or the output shaft negative pressure pump 30 during the execution of the inertia running. At the time other than the case where the output shaft negative pressure pump 30 generates the negative pressure, the pump clutch 31 is opened and the output shaft negative pressure pump 30 is separated from the output shaft 21. Thus, it is possible to minimize an increase in friction due to the installation of the output shaft negative pressure pump 30 and hence to improve the fuel efficiency. Further, when the negative pressure is accumulated in the negative pressure tank 12, the negative pressure is supplied from the negative pressure tank 12 to the brake servo unit 40 without operating the output shaft negative pressure pump 30. That is, in the supply of the negative pressure with respect to the brake servo unit 40, the priority in the supply of the negative pressure through the negative pressure tank 12 is higher than the priority in the supply of the negative pressure through the output shaft negative pressure pump 30. Accordingly, an increase in friction caused by the operation of the output shaft negative pressure pump 30 is suppressed, and the fuel efficiency can be improved.

Furthermore, in the embodiment, the power source of the vehicle 1 is the engine 10, but the vehicle 1 may further include, for example, a motor generator and the like as the power source other than the engine 10. Further, in the embodiment, the device which is operated by the negative pressure supplied thereto is the brake servo unit 40, but the present invention is not limited thereto. Instead of the brake servo unit 40 or in addition to the brake servo unit 40, another device which is operated by the negative pressure may be mounted on the vehicle 1.

The braking control system 1-1 according to the embodiment includes the output shaft negative pressure pump 30 which is connected to the output shaft 21 of the TM 20 as the pump which generates the negative pressure, but the pump which generates the negative pressure is not limited thereto. The pump which generates the negative pressure may be configured as a pump which is driven by the power transmitted from the wheel 23 of the vehicle 1, generates the negative pressure, and supplies the generated negative pressure to the brake servo unit 40. Further, the pump which generates the negative pressure may be another publicly known pump which consumes the kinetic energy of the vehicle 1 during the execution of the inertia running and generates the negative pressure.

In the embodiment, the output shaft negative pressure pump 30 can supply the negative pressure to both the brake servo unit 40 and the negative pressure tank 12 by the switching of the valve 13 or supply the negative pressure to only the brake servo unit 40. However, the output shaft negative pressure pump may supply the negative pressure to only the negative pressure tank 12. For example, the output shaft negative pressure pump 30 may be configured to directly supply the negative pressure to the negative pressure tank 12, not through the negative pressure pipe 11.

In the embodiment, the negative pressure is supplied by the negative pressure tank 12 or the output shaft negative pressure pump 30 when the negative pressure of the negative pressure chamber 41a decreases. However, instead of this configuration, the negative pressure may be normally supplied from any one of the negative pressure tank 12 and the output shaft negative pressure pump 30 regardless of the negative pressure of the negative pressure chamber 41a or the negative pressure pipe 11 during the execution of the inertia running. For example, the negative pressure may be normally supplied to the brake servo unit 40 by driving the output shaft negative pressure pump 30 during the execution of the inertia running, and the negative pressure of the negative pressure tank 12 may be normally supplied to the brake servo unit 40 during the execution of the inertia running. In this configuration, it is possible to maintain a constant pressure level of the negative pressure supplied to the brake servo unit 40, and hence to suppress degradation in drivability caused by a change in the negative pressure.

Further, when the negative pressure which is accumulated in the negative pressure tank 12 decreases, the negative pressure may be supplied to the negative pressure tank 12 by driving the output shaft negative pressure pump 30. For example, in a configuration in which the negative pressure is directly supplied from the output shaft negative pressure pump 30 to the negative pressure tank 12, when the negative pressure is supplied from the output shaft negative pressure pump 30 to the negative pressure tank 12 in response to a decrease in the negative pressure of the negative pressure tank 12, it is possible to maintain the state where the negative pressure tank 12 may normally supply the negative pressure.

Modified Example of First Embodiment

Figure 9:
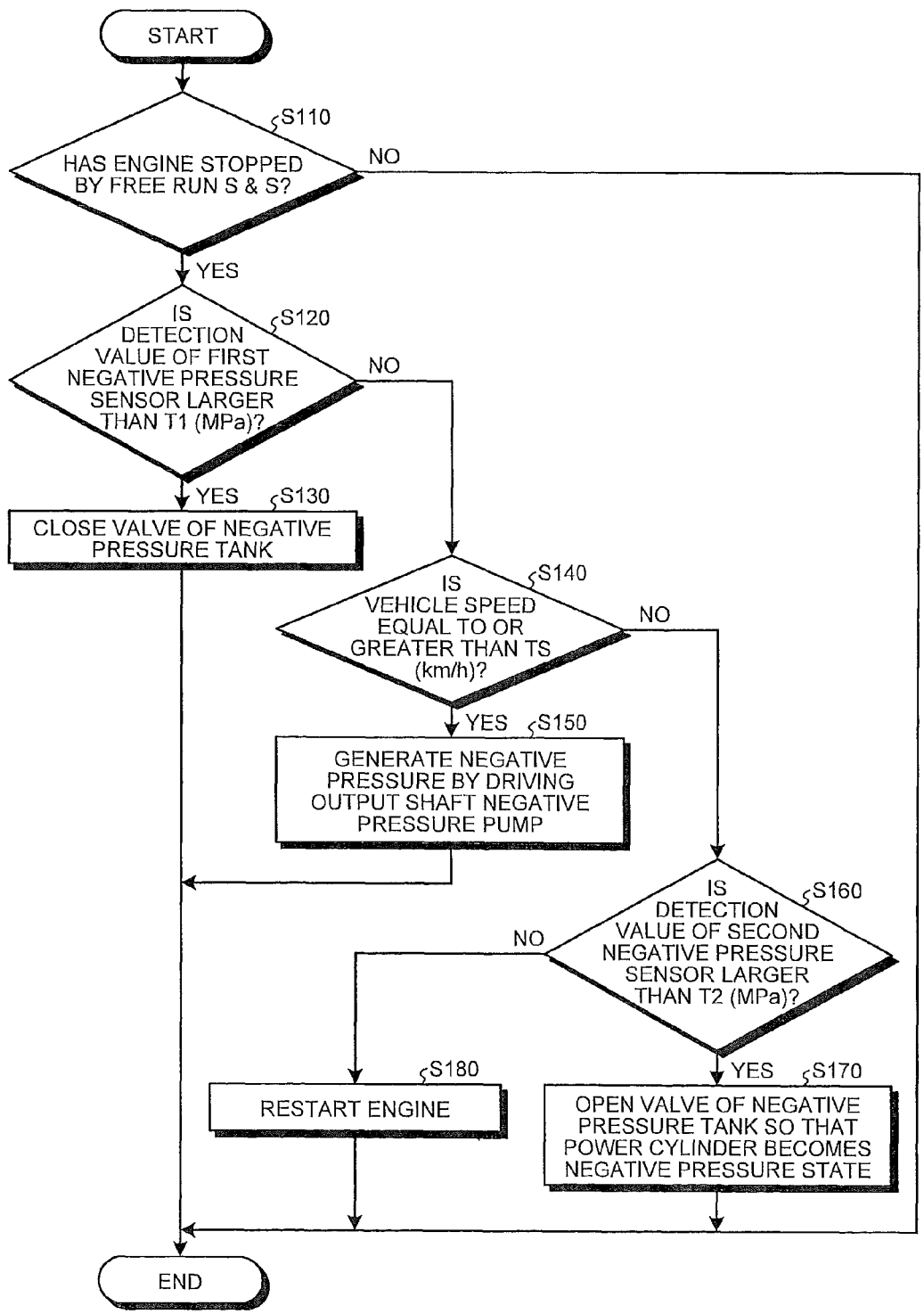
FIG. 9 is a flowchart illustrating an operation of a modified example.

A modified example of the first embodiment will be described. In the first embodiment, when the negative pressure of the negative pressure chamber 41a decreases, the negative pressure is first supplied from the negative pressure tank 12, and the negative pressure is supplied from the output shaft negative pressure pump 30. However, instead of this configuration, in the modified example, when the negative pressure of the negative pressure chamber 41a decreases, the negative pressure is first supplied from the output shaft negative pressure pump 30. That is, in the supply of the negative pressure with respect to the brake servo unit 40, the priority in the supply of the negative pressure using the output shaft negative pressure pump 30 is higher than the priority in the supply of the negative pressure using the negative pressure tank 12. When the negative pressure supply performance using the output shaft negative pressure pump 30 decreases at a low vehicle speed, the negative pressure of the negative pressure tank 12 is supplied to the brake servo unit 40. FIG. 9 is a flowchart illustrating an operation of the modified example.

The processes from step S110 to step S130 may be executed the same as in the processes from step S10 to step S30 of the first embodiment. That is, when the negative pressure management ECU 130 determines that the engine stops by the free run S & S (YES in step S110) and the detection value of the first negative pressure sensor 48 is larger than the first negative pressure T1 (YES in step S120), the valve 13 of the negative pressure tank 12 is closed (the first state) (step S130), and the control flow ends.

When the negative determination is made in step S120 and the routine proceeds to step S140, the negative pressure management ECU 130 determines whether the vehicle speed is equal to or greater than the predetermined vehicle speed TS in step S140. When it is determined that the vehicle speed is equal to or greater than the predetermined vehicle speed TS as a result of the determination (YES in step S140), the routine proceeds to step S150. In another case (NO in step S140), the routine proceeds to step S160.

In step S150, the negative pressure management ECU 130 engages the pump clutch 31 and drives the output shaft negative pressure pump 30 to generate the negative pressure. Further, the negative pressure management ECU 130 lights the indicator 29. When step S150 executed, the control flow ends.

In step S160, the negative pressure management ECU 130 determines whether the detection value of the second negative pressure sensor 15 is larger than the second negative pressure T2. When it determined that the detection value of the second negative pressure sensor 15 is larger than the second negative pressure T2 as a result of the determination (YES in step S160), the routine proceeds to step S170. In another case (NO in step S160), the routine proceeds to step S180.

In step S170, the negative pressure management ECU 130 opens the valve of the negative pressure tank 12 so that the power cylinder 41 becomes a negative pressure state. Further, the negative pressure management ECU 130 lights the indicator 29. When step S170 is executed, the control flow ends.

In step S180, the negative pressure management ECU 130 restarts the engine 10. When step S180 is executed, the control flow ends.

According to the modified example, the priority in the supply of the negative pressure using the output shaft negative pressure pump 30 is higher than the priority in the supply of the negative pressure using the negative pressure tank 12 when the negative pressure of the negative pressure chamber 41a decreases. Accordingly, the negative pressure of the negative pressure tank 12 can be preserved for a case of the engine failure or the like. For example, the engine 10 can be restarted while the negative pressure tank 12 has a negative pressure supply available capacity with respect to the negative pressure chamber 41a by setting the second negative pressure T2 to a comparatively large negative pressure. In this configuration, the negative pressure can be supplied from the negative pressure tank 12 to the negative pressure chamber 41a in a case where the restarting of the engine 10 fails.

When the negative pressure of the negative pressure chamber 41a decreases, the negative pressure management ECU 130 monitors the vehicle speed or the gear ratio of the TM 20 while monitoring the negative pressure of the negative pressure chamber 41a, and supplies the negative pressure by driving the output shaft negative pressure pump 30 as much as the necessary amount. According to the method of supplying the negative pressure using the output shaft negative pressure pump 30, it is possible to normally maintain the negative pressure supplied to the power cylinder 41 at a constant level or more without starting the engine 10.

Second Embodiment

Figure 10:
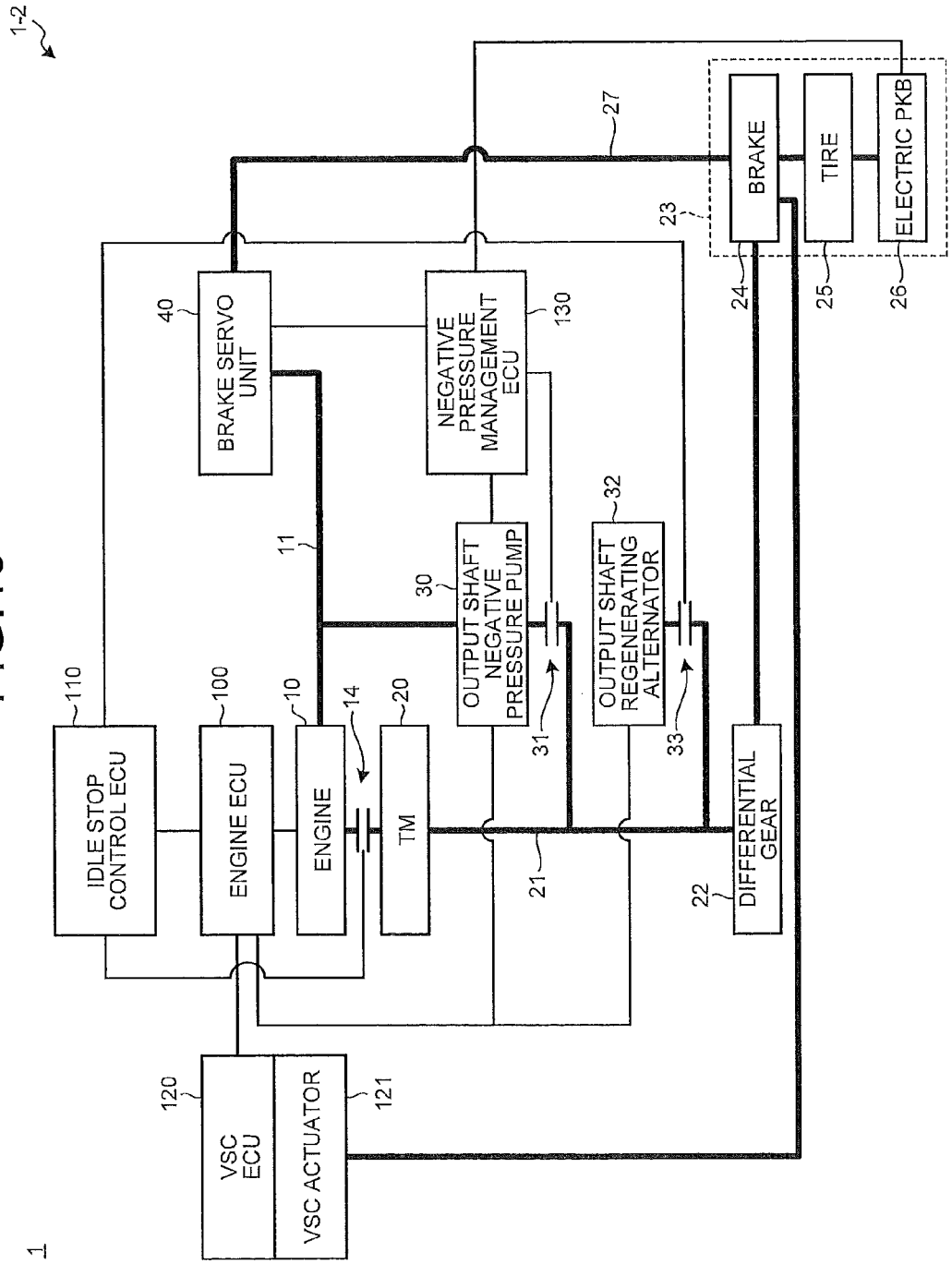
FIG. 10 is a diagram illustrating a schematic configuration of a vehicle according to a second embodiment.
Figure 11:
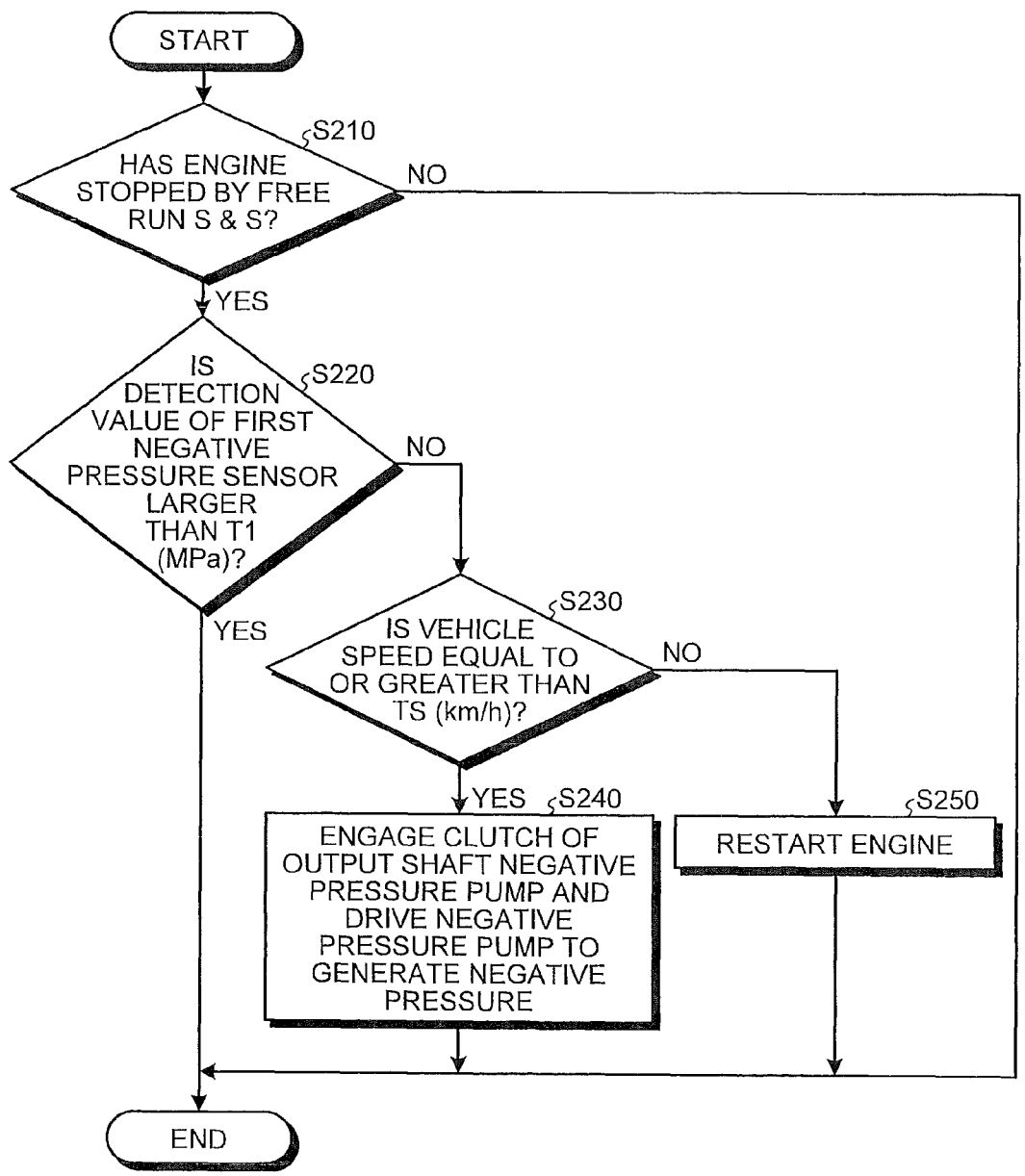
FIG. 11 is a flowchart illustrating an operation of the second embodiment.

Referring to FIGS. 10 and 11, a second embodiment will be described. In the second embodiment, the same reference signs will be given to the constituents having the same functions as those of the embodiment described above and the description thereof will not be repeated. FIG. 10 is a diagram illustrating a schematic configuration of the vehicle according to the embodiment.

A braking control system 1-2 of the embodiment is different from the braking control system 1-1 of the first embodiment in that the negative pressure tank 12 is not provided. When the negative pressure of the negative pressure chamber 41a decreases, the braking control system 1-2 recovers the negative pressure of the negative pressure chamber 41a by operating the output shaft negative pressure pump 30. FIG. 11 is a flowchart illustrating an operation of the embodiment.

First, in step S210, the negative pressure management ECU 130 determines whether the engine stops by the free run S & S. When a positive determination is made as a result of the determination (YES in step S210), the routine proceeds to step S220. In another case (NO in step S210), the control flow ends.

In step S220, the negative pressure management ECU 130 determines whether the detection value of the first negative pressure sensor 48 is larger than the first negative pressure T1. The first negative pressure T1 of the embodiment may be a value different from that of the first negative pressure T1 of the first embodiment. Even in the embodiments below, the first negative pressure T1 and the second negative pressure T2 may be different values for each embodiment. When a positive determination is made as a result of the determination in step S220 (YES in step S220), the control flow ends. In another case (NO in step S220), the routine proceeds to step S230.

In step S230, the negative pressure management ECU 130 determines whether the vehicle speed is equal to or greater than the predetermined vehicle speed TS. When the positive determination is made (YES in step S230), the routine proceeds to step S240. In another case (NO in step S230), the routine proceeds to step S250.

In step S240, the pump clutch 31 of the output shaft negative pressure pump 30 is engaged by the negative pressure management ECU 130, and the output shaft negative pressure pump 30 is driven to generate a negative pressure. The negative pressure which is generated by the output shaft negative pressure pump 30 is supplied to the power cylinder 41. When step S240 is executed, the control flow ends.

In step S250, the engine 10 is restarted by the negative pressure management ECU 130. Accordingly, the intake negative pressure which is generated by the engine 10 is supplied to the power cylinder 41. When step S250 is executed, the control flow ends.

In this way, according to the braking control system 1-2 of the embodiment, even when the negative pressure tank 12 is not provided, if the vehicle speed is equal to or greater than the predetermined vehicle speed TS, it is possible to suppress the lack in the negative pressure which is supplied to the power cylinder 41 without starting the engine 10 during the execution of the free run.

Furthermore, the first negative pressure T1 may be changed in response to the current vehicle speed or the like. For example, in the region of the vehicle speed which is equal to or greater than the predetermined vehicle speed TS, when the vehicle speed is slow, the first negative pressure T1 is set to a large negative pressure compared to the case where the vehicle speed is fast. In this configuration, when the vehicle speed approaches the predetermined vehicle speed TS as the vehicle speed decreases toward the predetermined vehicle speed TS, a negative determination is easily made in step S220. Thus, there is an increasing possibility that the negative pressure is supplied from the output shaft negative pressure pump 30 before the vehicle speed becomes slower than the predetermined vehicle speed TS, whereby the restarting of the engine 10 may be suppressed.

Third Embodiment

Figure 12:
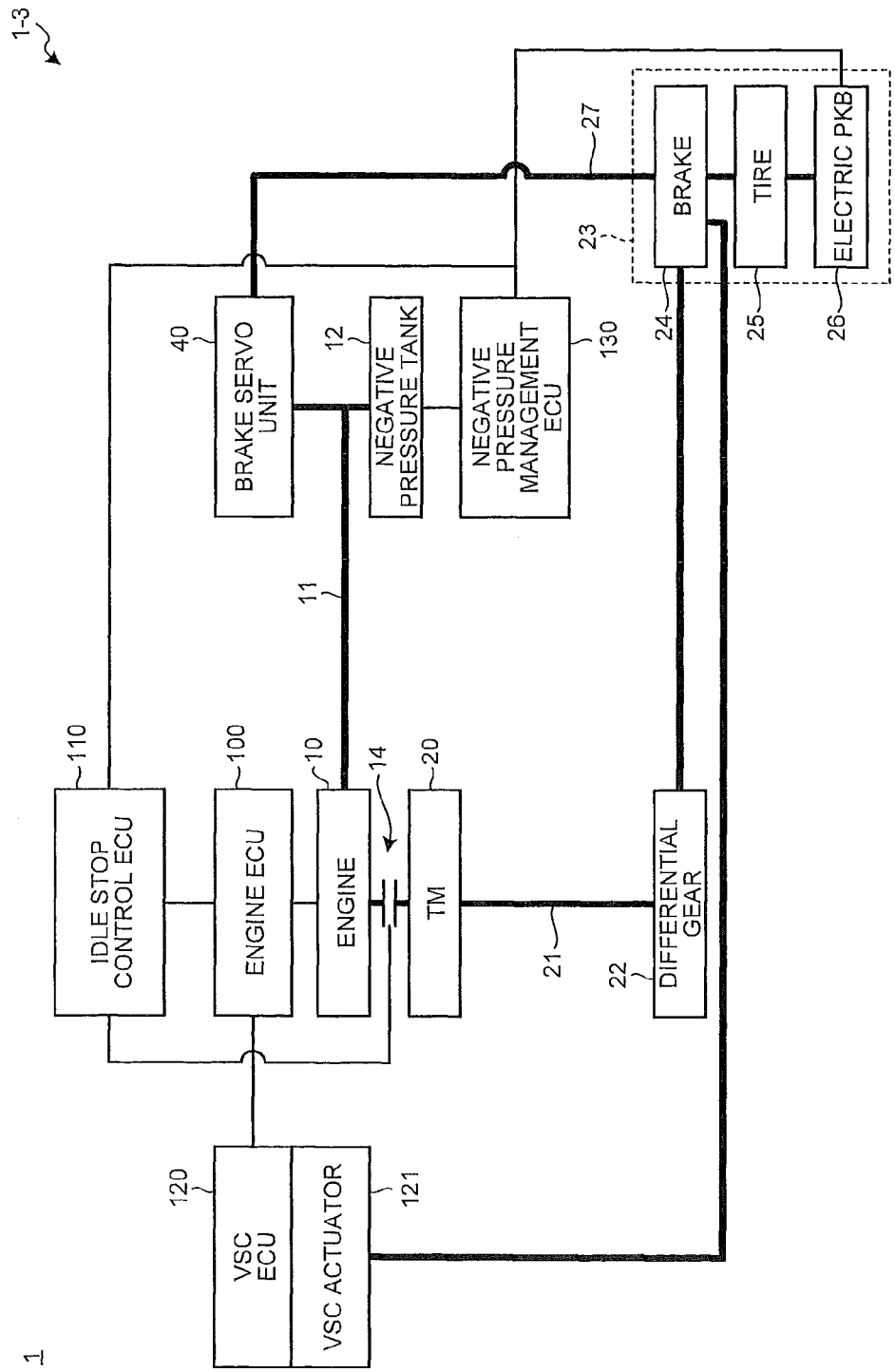
FIG. 12 is a diagram illustrating a schematic configuration of a vehicle according to a third embodiment.
Figure 13:
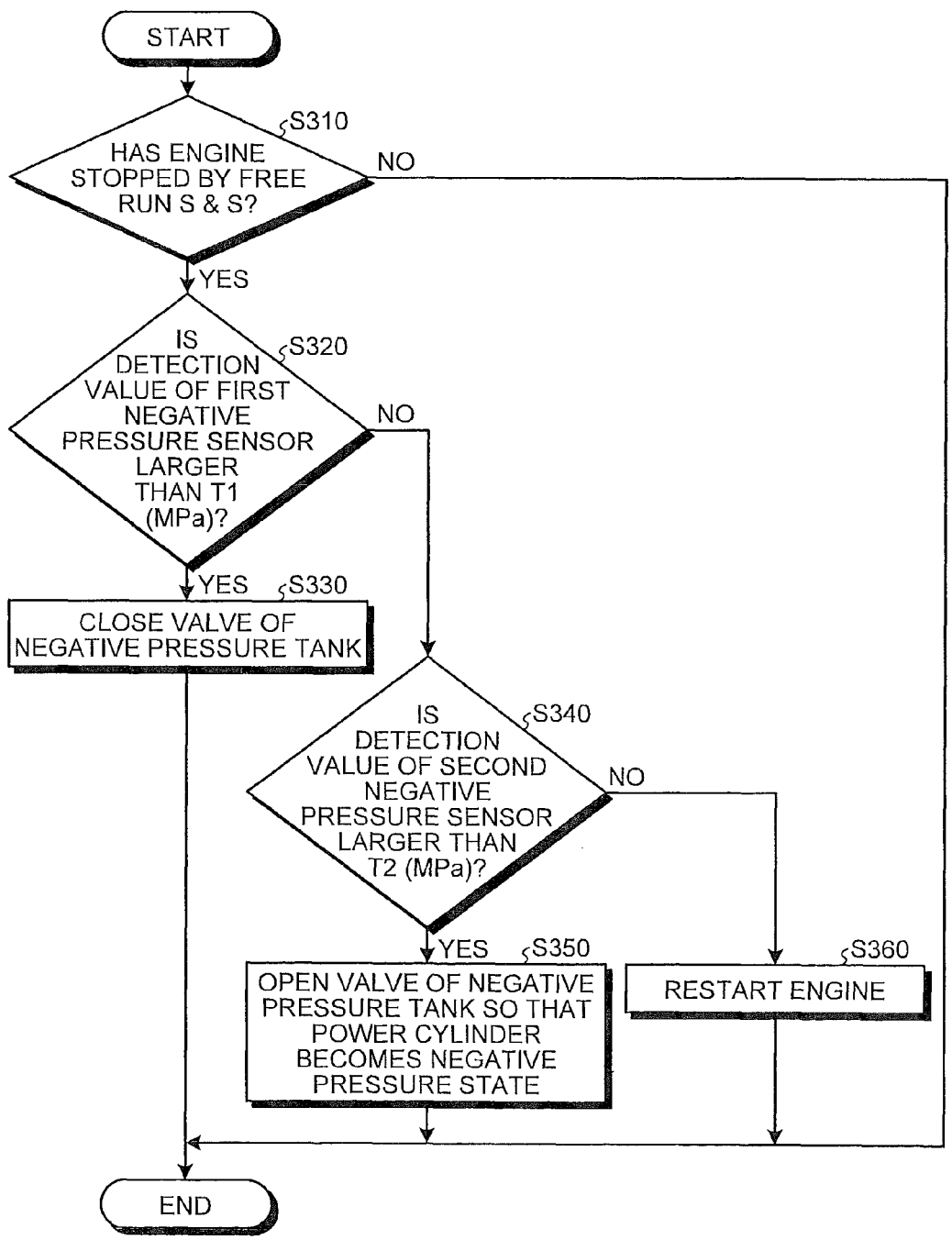
FIG. 13 is a flowchart illustrating an operation of the third embodiment.

Referring to FIGS. 12 and 13, a third embodiment will be described. In the third embodiment, the same reference signs will be given to the constituents having the same functions and the description thereof will not be repeated. FIG. 12 is a diagram illustrating a schematic configuration of the vehicle according to the embodiment.

A braking control system 1-3 according to the third embodiment is different from the braking control system 1-1 of the first embodiment in that the output shaft negative pressure pump 30 and the output shaft regenerating alternator 32 are not provided. The braking control system 1-3 restores the negative pressure of the negative pressure chamber 41a by supplying the negative pressure which is accumulated in advance in the negative pressure tank 12 during the operation of the engine to the power cylinder 41 during the execution of the free run. FIG. 13 is a flowchart illustrating an operation of the embodiment.

First, in step S310, the negative pressure management ECU 130 determines whether the engine stops by the free run S & S. When a positive determination is made as a result of the determination (YES in step S310), the routine proceeds to step S320. In another case (NO in step S310), the control flow ends.

In step S320, the negative pressure management ECU 130 determines whether the detection value of the first negative pressure sensor 48 is larger than the first negative pressure T1. When a positive determination is made as a result of the determination in step S320 (YES in step S320), the routine proceeds to step S330. In another case (NO in step S320), the routine proceeds to step S340.

In step S330, the negative pressure management ECU 130 closes the valve of the negative pressure tank 12 (the first state). When step S330 is executed, the control flow ends.

In step S340, the negative pressure management ECU 130 determines whether the detection value of the second negative pressure sensor 15 is larger than the second negative pressure T2. When a positive determination is made as a result of the determination in step S340 (YES in step S340), the routine proceeds to step S350. In another case (NO in step S340), the routine proceeds to step S360.

In step S350, the negative pressure management ECU 130 causes the valve of the negative pressure tank 12 to open so that the power cylinder 41 becomes a negative pressure state. The negative pressure management ECU 130 causes the valve 13 to be in the second state. Accordingly, the negative pressure which is accumulated in the negative pressure tank 12 is supplied to the power cylinder 41, so that the negative pressure of the negative pressure chamber 41a and the air chamber 41b increases. When step S350 is executed, the control flow ends.

In step S360, the negative pressure management ECU 130 restarts the engine 10. Accordingly, the negative pressure which is generated by the engine 10 is supplied to the power cylinder 41. When step S360 is executed, the control flow ends.

In this way, according to the braking control system 1-3 of the embodiment, even when the output shaft negative pressure pump 32 is not provided, it is possible to suppress the lack in the negative pressure which is supplied to the power cylinder 41 without starting the engine 10 during the execution of the free run by the negative pressure which is accumulated in advance inside the negative pressure tank 12.

Fourth Embodiment

Figure 14:
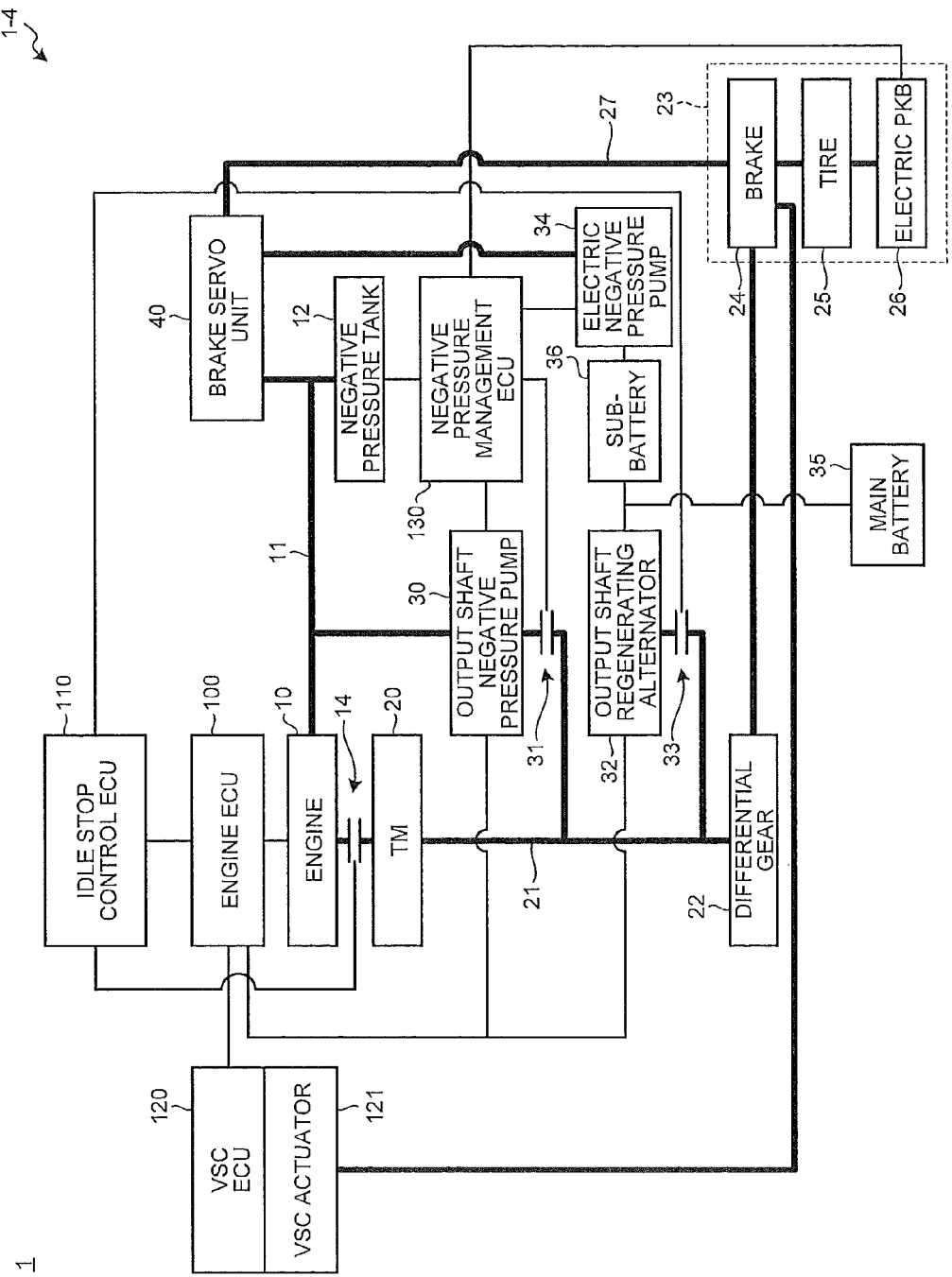
FIG. 14 is a diagram illustrating a schematic configuration of a vehicle according to a fourth embodiment.
Figure 15:
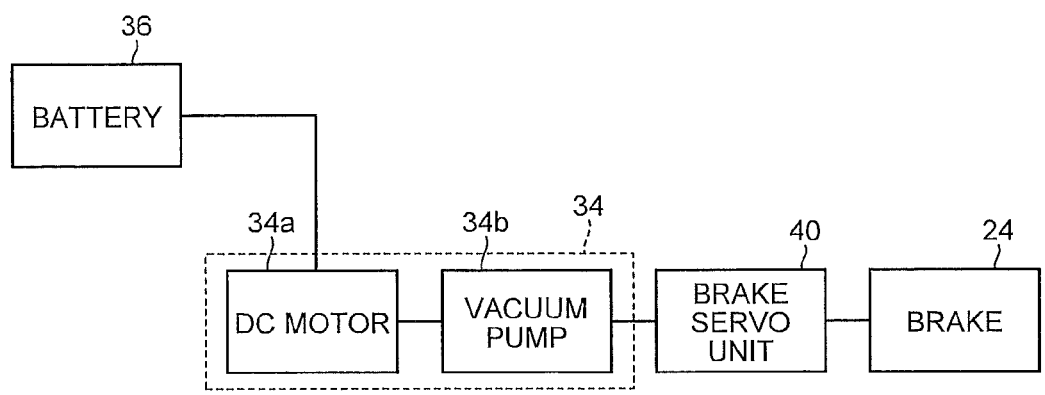
FIG. 15 is a diagram illustrating an electric negative pressure pump in which a DC motor serves as a driving source.
Figure 16:
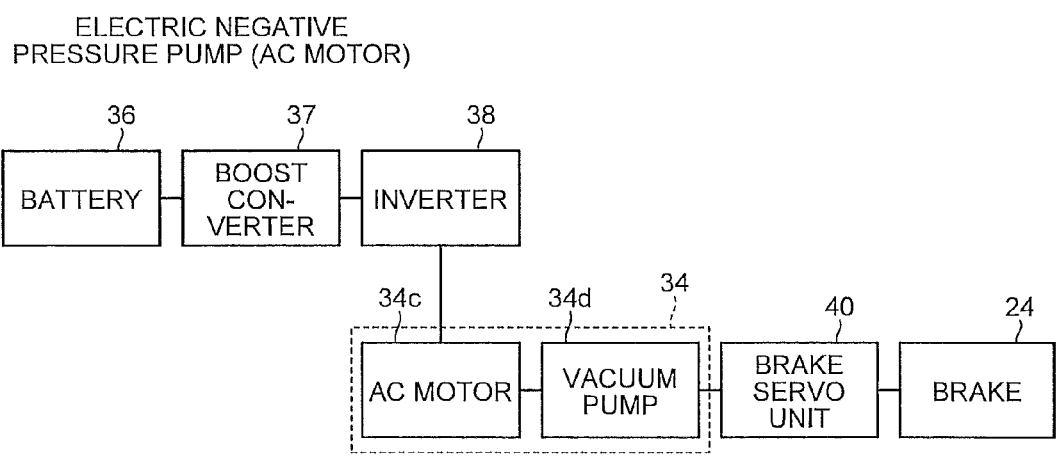
FIG. 16 is a diagram illustrating an electric negative pressure pump in which an AC motor serves as a driving source.
Figure 17:
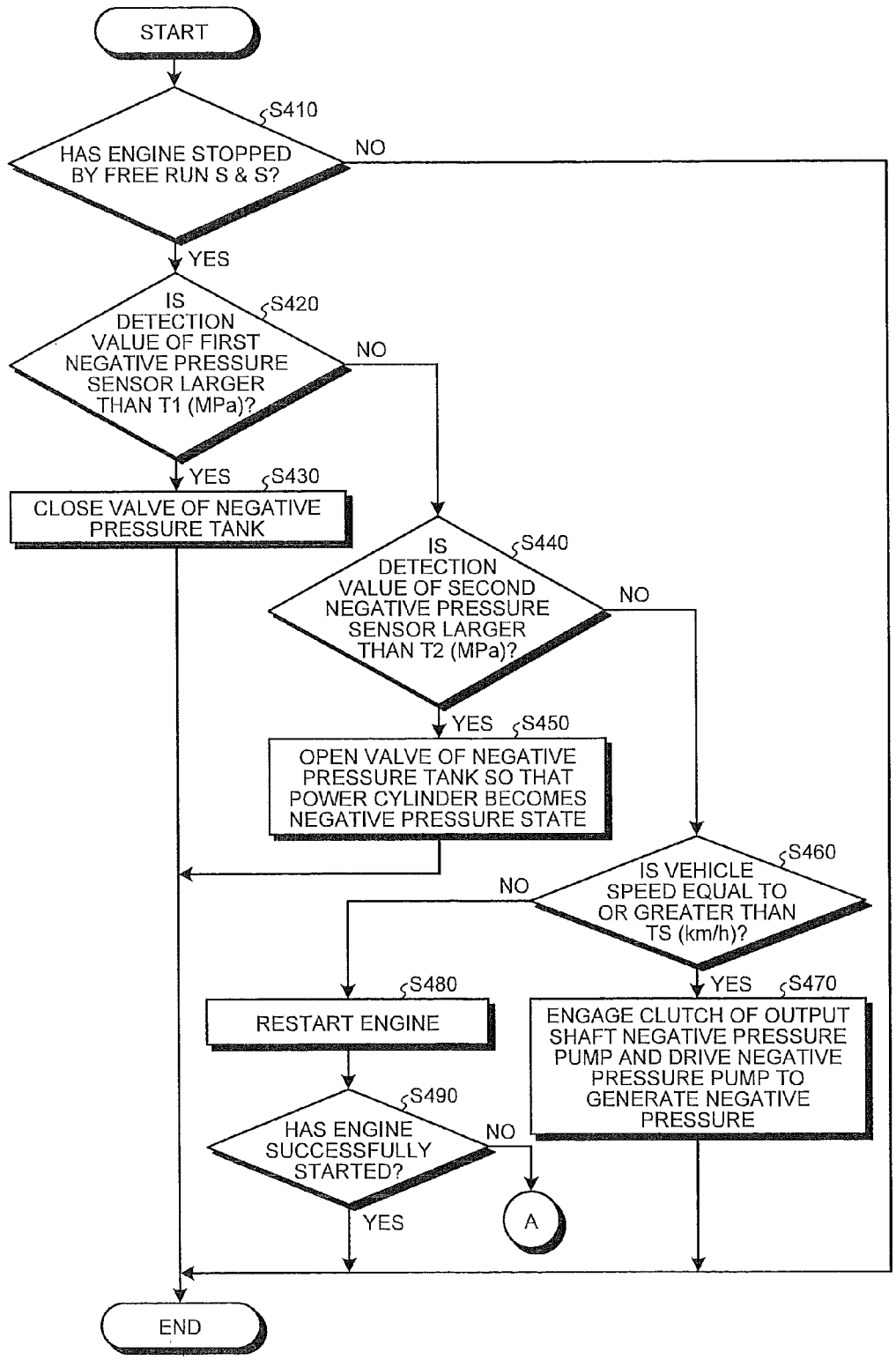
FIG. 17 is a flowchart illustrating an operation of the fourth embodiment.
Figure 18:
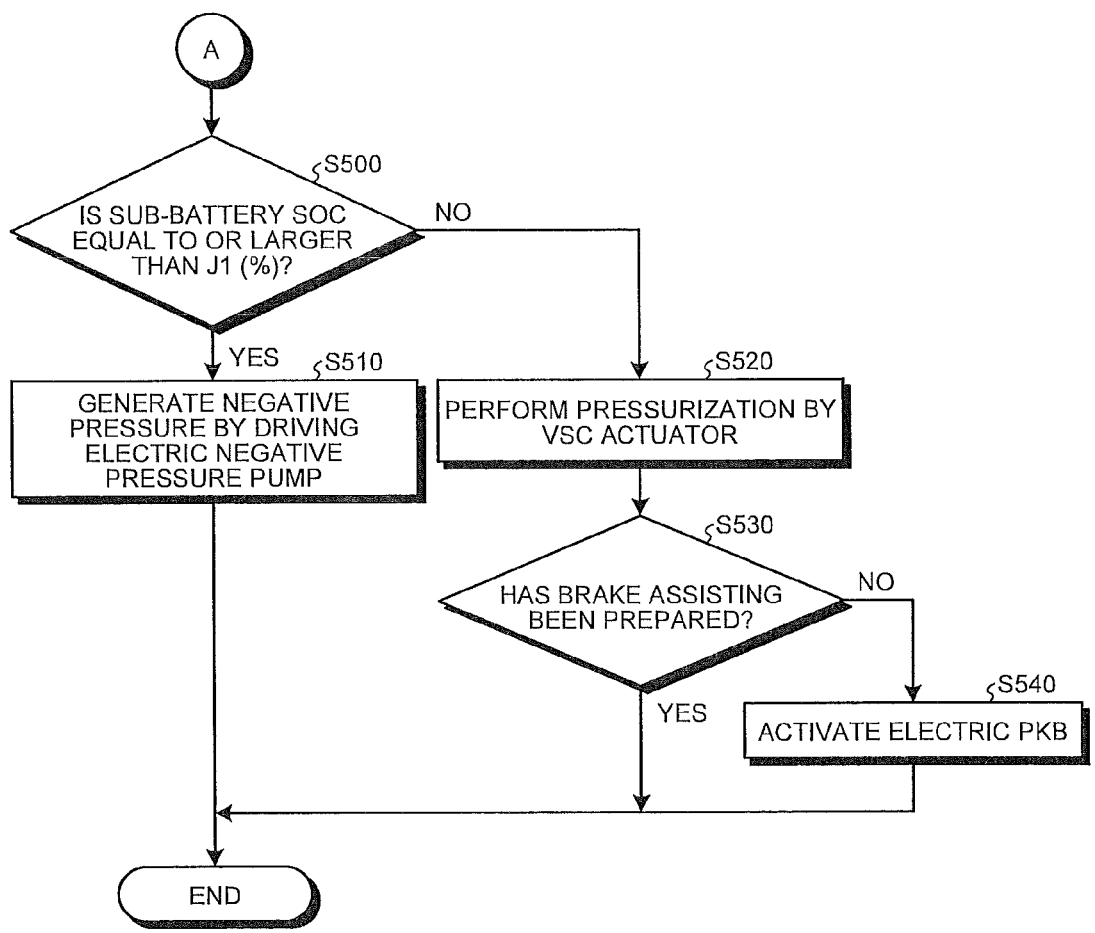
FIG. 18 is another flowchart illustrating an operation of the fourth embodiment.

Referring to FIGS. 14 to 18, a fourth embodiment will be described. In the fourth embodiment, the same reference signs will be given to the constituents having the same functions and the description thereof will not be repeated. FIG. 14 is a diagram illustrating a schematic configuration of the vehicle according to the embodiment, FIG. 17 is a flowchart illustrating an operation of the embodiment, and FIG. 18 is another flowchart illustrating an operation of the embodiment.

A braking control system 1-4 according to the embodiment is different from the braking control system 1-1 of the first embodiment in that an electric negative pressure pump 34 is provided. When the starting of the engine 10 fails upon recovering the negative pressure supplied to the brake servo unit 40 during the execution of the free run, the electric negative pressure pump 34 is operated, so that the negative pressure is supplied to the power cylinder 41. Accordingly, it is possible to further reliably suppress the lack in the negative pressure supplied to the brake servo unit 40.

As illustrated in FIG. 14, the vehicle 1 includes the electric negative pressure pump 34, a main battery 35, and a sub-battery 36. The main battery 35 and the sub-battery 36 are chargeable/dischargeable electrical storage devices. The main battery 35 serves as a main power supply of the vehicle 1 and can supply electric power to the respective electrical constituents of the vehicle 1. The sub-battery 36 can output electric power by assisting the main battery 35. The main battery 35 and the sub-battery 36 are respectively connected to the output shaft regenerating alternator 32, and can be charged by the electric power generated by the output shaft regenerating alternator 32. Regarding the charging of the battery, the charging of the main battery 35 is prioritized, and the sub-battery 36 is charged when the main battery 35 is fully charged.

The electric negative pressure pump 34 is a vacuum pump which generates the negative pressure by being operated by the electric power from the sub-battery 36. The electric negative pressure pump 34 is connected to the brake servo unit 40, and can supply the negative pressure to the negative pressure chamber 41a and the air chamber 41b of the power cylinder 41. The electric negative pressure pump 34 is connected to, for example, the brake servo unit 40 in relation to the valve 13 in the negative pressure pipe 11. Further, the electric negative pressure pump 34 is connected to the negative pressure management ECU 130, and is controlled by the negative pressure management ECU 130.

The electric negative pressure pump 34 is, for example, a vacuum pump which includes a DC motor as a driving source. FIG. 15 is a diagram illustrating the electric negative pressure pump 34 in which the DC motor serves as the driving source. When the driving source of the electric negative pressure pump 34 is the DC motor, as illustrated in FIG. 15, a DC motor 34a which is operated by the electric power from the sub-battery 36 drives a vacuum pump 34b to generate the negative pressure.

Furthermore, the driving source of the electric negative pressure pump 34 is not limited to the DC motor, and may be also, for example, an AC motor. FIG. 16 is a diagram illustrating the electric negative pressure pump 34 in which the AC motor serves as the driving source. When the driving source of the electric negative pressure pump 34 is the AC motor, as illustrated in FIG. 16, an AC motor 34c is connected to the sub-battery 36 through a boost converter 37 and an inverter 38. The AC motor 34c drives a vacuum pump 34d by the electric power of the sub-battery 36 supplied thereto through the boost converter 37 and the inverter 38 to generate the negative pressure.

Hereinafter, referring to FIGS. 17 and 18, an operation of the embodiment will be described. In FIG. 17, the processes from step S410 to step S480 can be executed the same as in the processes from step S10 to step S80 of the first embodiment (FIG. 1).

The negative pressure management ECU 130 determines that the engine stops by the free run S & S (YES in step S410) and the detection value of the first negative pressure sensor 48 is larger than the first negative pressure T1 (YES in step S420), the valve 13 of the negative pressure tank 12 becomes a closed state (the first state) (step S430), and the control flow ends. When a negative determination is made in step S420 (NO in step S420) and the detection value of the second negative pressure sensor 15 is larger than the second negative pressure T2 (YES in step S440), the valve 13 becomes the second state (FIG. 8) (step S450), and the control flow ends.

When a negative determination is made in step S440 (NO in step S440) and the vehicle speed is equal to or greater than the predetermined vehicle speed TS (YES in step S460), the pump clutch 31 is engaged, and the output shaft negative pressure pump 30 is driven to generate the negative pressure (step S470). Then, the control flow ends. When a negative determination is made in step S460 (NO in step S460), the engine 10 is restarted by the negative pressure management ECU 130 in step S480. When step S480 is executed, the routine proceeds to step S490.

In step S490, the negative pressure management ECU 130 determines whether the engine is successfully started. The negative pressure management ECU 130 executes the determination of step S490 based on the signal representing the operation state of the engine 10 and transmitted from the engine ECU 100. When it is determined that the engine 10 is successfully started as a result of the determination (YES in step S490), the control flow ends. When it is determined that the engine is not successfully started (NO in step S490), the routine proceeds to step S500 (FIG. 18).

In step S500, the negative pressure management ECU 130 determines whether the charging state SOC of the sub-battery 36 is equal to or larger than a predetermined threshold value J1 (%). The charging state SOC of the sub-battery 36 is acquired from, for example, a monitoring device which monitors the charging/discharging state of the sub-battery 36. The threshold value J1 is set based on, for example, the power consumption of the electric negative pressure pump 34. The threshold value J1 is defined in advance based on, for example, the charging state SOC which is necessary to generate the negative pressure sufficient to drive the electric negative pressure pump 34. When it is determined that the charging state SOC of the sub-battery 36 becomes equal to or larger than the threshold value J1 as a result of the determination in step S500 (YES in step S500), the routine proceeds to step S510. In another case (NO in step S500), the routine proceeds to step S520.

In step S510, the negative pressure management ECU 130 drives the electric negative pressure pump 34 and generates the negative pressure. The negative pressure management ECU 130 generates the negative pressure by operating the electric negative pressure pump 34 by the electric power from the sub-battery 36. The negative pressure which is generated by the electric negative pressure pump 34 is supplied to the power cylinder 41 of the brake servo unit 40. Accordingly, even when the engine 10 is not successfully started and the intake negative pressure of the engine 10 cannot be used, the negative pressure is supplied to the negative pressure chamber 41a of the brake servo unit 40. When step S510 is executed, the control flow ends.

In step S520, the pressurization is performed by the VSC actuator 121. The negative pressure management ECU 130 makes a request to the VSCECU 120 so that the VSC actuator 121 supplies the hydraulic pressure of the brake 24 of each wheel 23 and generates the braking force. By receiving the request, the VSCECU 120 pressurizes the hydraulic oil by operating the electric hydraulic pressure pump of the VSC actuator 121. The electric hydraulic pressure pump of the VSC actuator 121 is operated by, for example, the power from the main battery 35. When step S520 is executed, the routine proceeds to step S530.

In step S530, the negative pressure management ECU 130 determines whether the brake assisting preparation has been made. The negative pressure management ECU 130 executes the determination of step S530 based on the information acquired from the VSCECU 120. The VSCECU 120 outputs a signal representing a state where the brake assisting preparation has been made (the brake is normally assisted) when the devices involved with the brake assisting such as an electric hydraulic pressure pump or a hydraulic control solenoid valve of the VSC actuator 121 are normally operated. The negative pressure management ECU 130 determines whether the brake assisting preparation has been made in the VSC actuator 121 based on the signal acquired from the VSCECU 120. When it is determined that the brake assisting preparation has been made as a result of the determination (YES in step S530), the control flow ends. When it is determined that the brake assisting preparation has not been made (NO in step S530), the routine proceeds to step S540.

In step S540, the electric PKB 26 is activated by the negative pressure management ECU 130. The negative pressure management ECU 130 generates the braking force in each wheel 23 by activating the electric PKB 26. For example, the electric PKB 26 generates the braking force by being operated while consuming the electric power from the main battery 35. When step S540 is executed, the control flow ends.

In this way, the braking control system 1-4 can brake the vehicle 1 by assisting the braking force using the VSC actuator 121 or the electric PKB 26 even when the engine 10 is not successfully restarted and the negative pressure of the brake servo unit 40 is not sufficient.

Furthermore, the configurations or the controls disclosed in the above-described respective embodiments may be appropriately combined with each other.

INDUSTRIAL APPLICABILITY

As described above, the braking control system according to the present invention is useful for suppressing the lack in the negative pressure supplied to the brake servo unit during the execution of the inertia running, and is particularly suitable for suppressing the lack in the negative pressure without starting the internal combustion engine.

REFERENCE SIGNS LIST 1-1, 1-2, 1-3, 1-4 BRAKING CONTROL SYSTEM
1 VEHICLE
10 ENGINE
11 NEGATIVE PRESSURE PIPE
12 NEGATIVE PRESSURE TANK
13 VALVE
21 OUTPUT SHAFT
23 WHEEL
29 INDICATOR
30 OUTPUT SHAFT NEGATIVE PRESSURE PUMP
34 ELECTRIC NEGATIVE PRESSURE PUMP
40 BRAKE SERVO UNIT
41a NEGATIVE PRESSURE CHAMBER
100 ENGINE ECU
110 IDLE STOP CONTROL ECU
120 VSCECU
130 NEGATIVE PRESSURE MANAGEMENT ECU

The invention claimed is:
1. A braking control system, comprising:
an internal combustion engine serving as a power source of a vehicle;
a brake servo unit operated by a negative pressure supplied thereto;
a passage configured to supply an intake negative pressure of the internal combustion engine to the brake servo unit;
a negative pressure pump configured to generate a negative pressure by being driven by power transmitted from a wheel of the vehicle and transmit the generated negative pressure to the brake servo unit; and
an accumulator capable of accumulating the intake negative pressure during operation of the internal combustion engine and supplying the accumulated negative pressure to the brake servo unit, wherein
during execution of inertia running in which the internal combustion engine stops and the vehicle runs by inertia, it is possible to drive the negative pressure pump and supply negative pressure to the brake servo unit without supplying negative pressure by the accumulator and it is also possible to supply the negative pressure accumulated in the accumulator to the brake servo unit without supplying the negative pressure by the negative pressure pump.

2. The braking control system according to claim 1, wherein negative pressure is supplied to the brake servo unit when the negative pressure of the passage decreases during the execution of the inertia running.

3. The braking control system according to claim 2, wherein in supply of the negative pressure with respect to the brake servo unit, a priority in the supply of the negative pressure using the accumulator is higher than a priority in the supply of the negative pressure using the negative pressure pump.

4. The braking control system according to claim 3, wherein the negative pressure pump supplies the generated negative pressure to the accumulator in addition to the brake servo unit, and
when the negative pressure accumulated in the accumulator decreases, the negative pressure pump is driven so as to supply the negative pressure to the accumulator.

5. The braking control system according to claim 2, wherein in supply of the negative pressure with respect to the brake servo unit, a priority in the supply of the negative pressure using the negative pressure pump is higher than a priority in the supply of the negative pressure using the accumulator.

6. The braking control system according to claim 2, further comprising:
a notifying device configured to notify to a driver of the vehicle at least one of a state where the negative pressure supplied to the brake servo unit decreases and a state where the negative pressure is supplied to the brake servo unit, when the negative pressure of the passage decreases and the negative pressure is supplied to the brake servo unit during the execution of the inertia running.

7. The braking control system according to claim 1, further comprising:
a control valve configured to close or open an opening portion of the accumulator, wherein
the opening portion is opened by the control valve upon accumulating the intake negative pressure in the accumulator and upon supplying the negative pressure accumulated in the accumulator to the brake servo unit, and
at a time different from the cases of the accumulation and the supply of the negative pressure, the opening portion is closed by the control valve.

8. The braking control system according to claim 7, wherein the accumulator is connected to the passage,
the control valve is capable of switching to a predetermined state in which the opening portion is opened so as to communicate between the passage and the accumulator and the passage, near the internal combustion engine side in relation to the accumulator and the brake servo unit, is closed, and
the control valve is switched to the predetermined state during the supply of the negative pressure.

9. The braking control system according to claim 5, wherein, when there is no negative pressure supply to the brake servo unit by the negative pressure pump during the execution of the inertia running, the internal combustion engine is re-started in a state that the accumulator has available capacity to supply negative pressure to the brake servo unit.

* * * * *